United States Patent
Agiwal et al.

(10) Patent No.: US 10,224,994 B2
(45) Date of Patent: Mar. 5, 2019

(54) SYSTEM AND METHOD OF CONNECTED MODE DISCONTINUOUS OPERATION IN BEAMFORMED SYSTEM

(71) Applicant: Samsung Electronics Co., Ltd., Suwon-si, Gyeonggi-do (KR)

(72) Inventors: Anil Agiwal, Suwon-si (KR); Byounghoon Jung, Suwon-si (KR); Sangwook Kwon, Suwon-si (KR); Youngbin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 15/441,838

(22) Filed: Feb. 24, 2017

(65) Prior Publication Data

US 2017/0251518 A1 Aug. 31, 2017

Related U.S. Application Data

(60) Provisional application No. 62/300,354, filed on Feb. 26, 2016, provisional application No. 62/357,604, filed on Jul. 1, 2016.

(51) Int. Cl.

| | |
|---|---|
| *H04B 7/06* | (2006.01) |
| *H04W 24/08* | (2009.01) |
| *H04W 76/28* | (2018.01) |
| *H04W 88/08* | (2009.01) |
| *H04W 88/02* | (2009.01) |

(52) U.S. Cl.
CPC ......... *H04B 7/0617* (2013.01); *H04B 7/0619* (2013.01); *H04W 24/08* (2013.01); *H04W 76/28* (2018.02); *H04W 88/02* (2013.01); *H04W 88/08* (2013.01)

(58) Field of Classification Search
CPC ... H04B 7/0617; H04B 7/0619; H04W 24/08; H04W 88/08; H04W 88/02; H04W 76/28
See application file for complete search history.

(56) References Cited

U.S. PATENT DOCUMENTS

| | | | |
|---|---|---|---|
| 2012/0014344 A1 | 1/2012 | Yu et al. | |
| 2013/0301421 A1 | 11/2013 | Yi et al. | |
| 2014/0162673 A1* | 6/2014 | Yu | H04L 1/0027 455/452.1 |
| 2014/0269480 A1 | 9/2014 | Han | |
| 2015/0078189 A1 | 3/2015 | Kwon et al. | |

(Continued)

FOREIGN PATENT DOCUMENTS

KR 10-2015-0031584 A 3/2015

*Primary Examiner* — Brian D Nguyen
(74) *Attorney, Agent, or Firm* — Jefferson IP Law, LLP

(57) ABSTRACT

A communication method and a system for converging a fifth generation (5G) communication system for supporting higher data rates beyond a fourth generation (4G) system with a technology for internet of things (IoT) are provided. A terminal and a base station and communication method of the same are provided. The method includes receiving, from a base station (BS), configuration information of discontinuous reception (DRX), performing beam measurement before a start of an on duration of the DRX, transmitting, to the BS, beam feedback information according to the beam measurement result, and performing a certain operation after transmitting the beam feedback information.

13 Claims, 31 Drawing Sheets

(56) References Cited

U.S. PATENT DOCUMENTS

| | | | |
|---|---|---|---|
| 2015/0237635 A1* | 8/2015 | Yu | H04W 72/06 |
| | | | 370/311 |
| 2015/0296561 A1 | 10/2015 | Kim et al. | |
| 2016/0192433 A1* | 6/2016 | Deenoo | H04W 72/046 |
| | | | 370/329 |
| 2016/0219475 A1* | 7/2016 | Kim | H04L 5/00 |
| 2016/0227428 A1* | 8/2016 | Novlan | H04W 24/10 |
| 2018/0035372 A1* | 2/2018 | Pradas | H04W 76/28 |

* cited by examiner

FIG. 15

| TX/RX Beam Change | Data Sent Using TX beam reported during last wake up |
|---|---|
| No | No |
| No | Yes |
| Yes | No |
| Yes | Yes |

UE can not distinguish.
UE may not start inactivity timer and goes to sleep

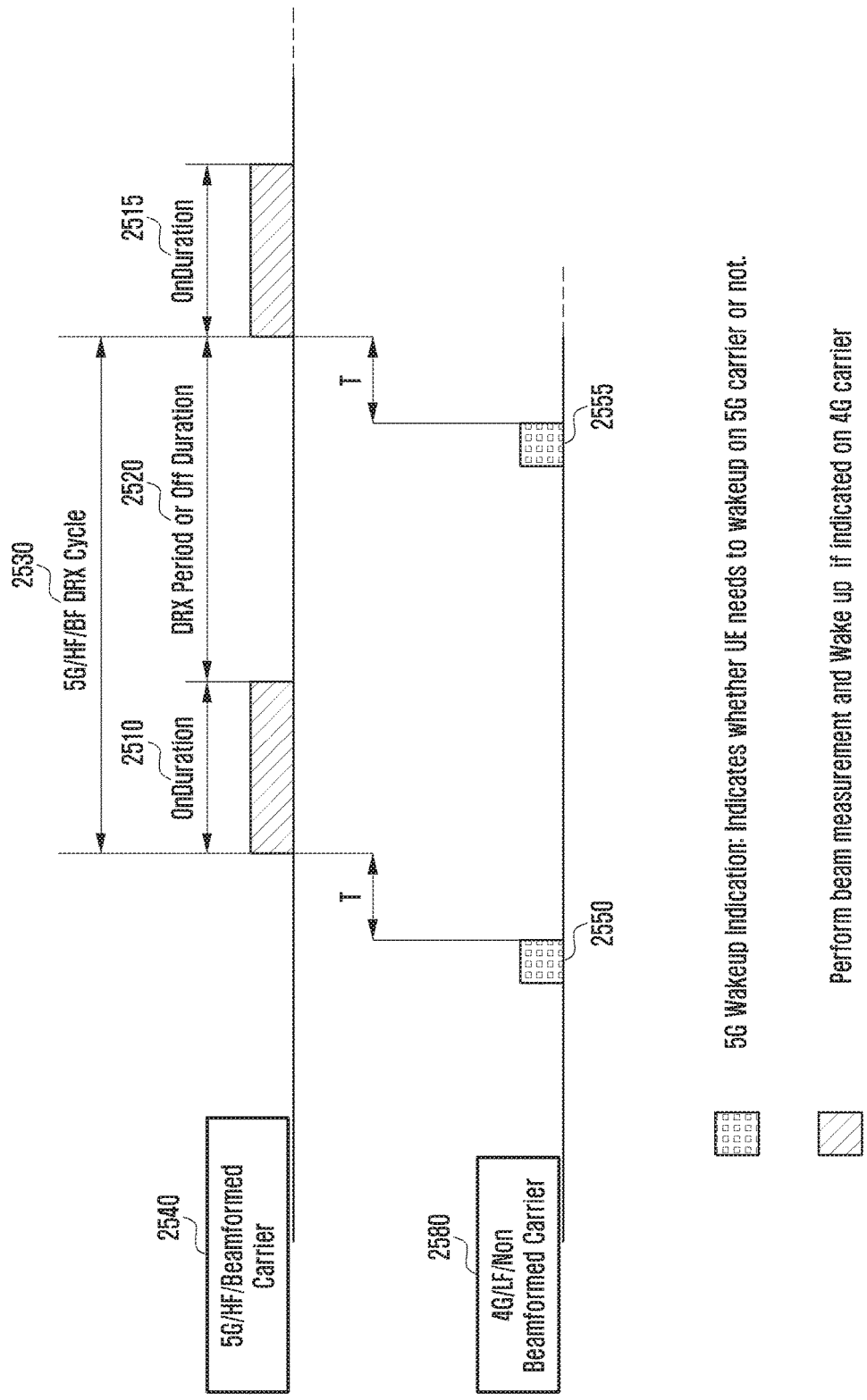

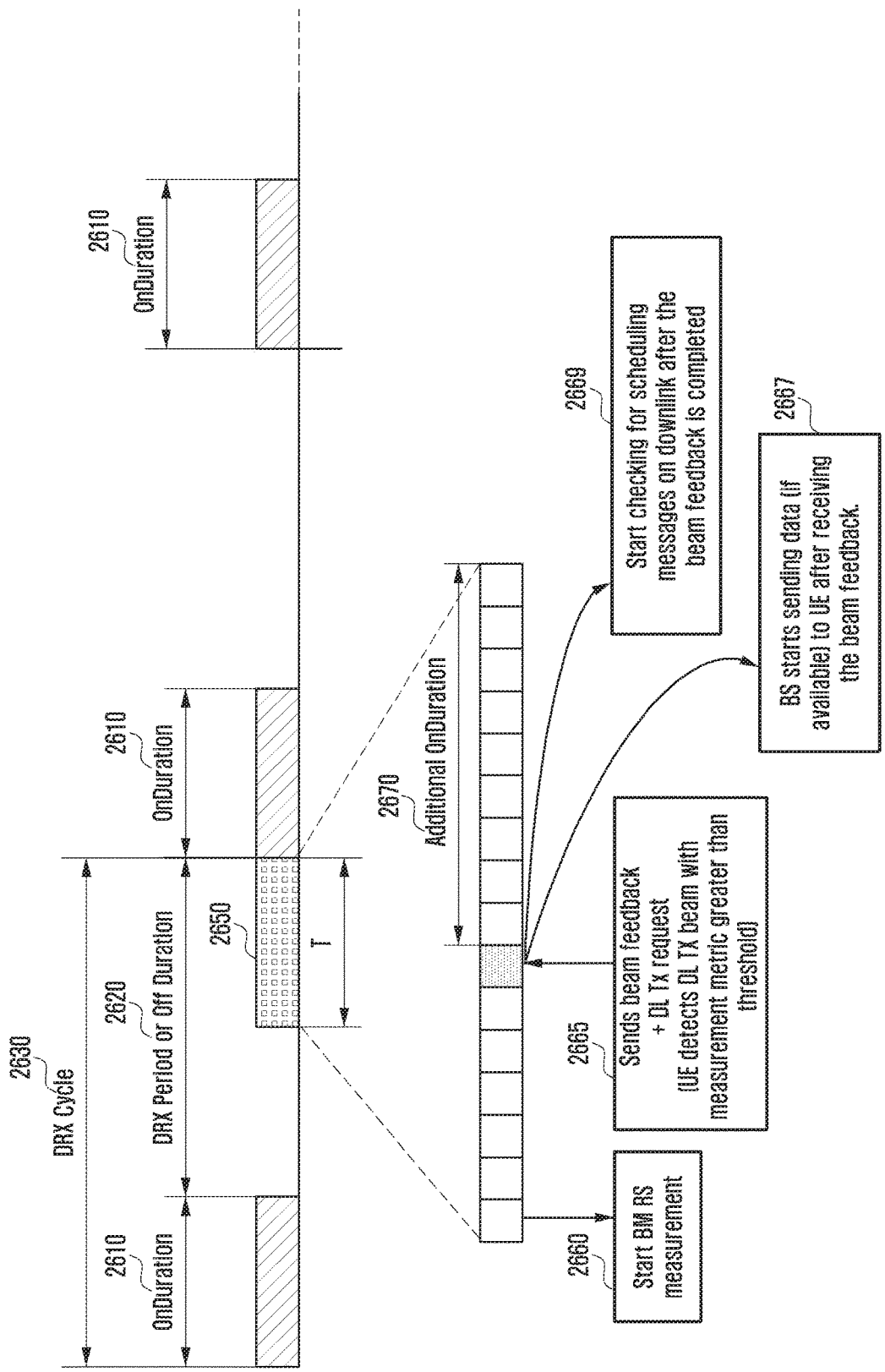

US 10,224,994 B2

SYSTEM AND METHOD OF CONNECTED MODE DISCONTINUOUS OPERATION IN BEAMFORMED SYSTEM

CROSS-REFERENCE TO RELATED APPLICATION(S)

This application claims the benefit under 35 U.S.C. § 119(e) of a U.S. provisional patent application filed on Feb. 26, 2016 in the U.S. Patent and Trademark Office and assigned Ser. No. 62/300,354, and of a U.S. provisional patent application filed on Jul. 1, 2016 in the U.S. Patent and Trademark Office and assigned Ser. No. 62/357,604, the entire disclosure of each of which is hereby incorporated by reference.

TECHNICAL FIELD

The present disclosure relates to a method and an apparatus for discontinuous operation in a beam formed system.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

Compared to existing 4G systems, 5G systems are expected to support more diversified services. For example, representative services may include enhanced mobile broad band (eMBB), ultra-reliable and low latency communication (URLLC), massive MTC (mMTC), and evolved multimedia broadcast/multicast service (eMBMS). A system providing URLLC services may be referred to as a URLLC system, a system providing eMBB services may be referred to as an eMMB system, and a system providing mMTC services may be referred to as an mMTC system. The words "service" and "system" may be used interchangeably.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an enhanced discontinuous reception (DRX) operation of a mobile station (MS) considering beam forming.

Another aspect of the present disclosure is to provide a method for channel quality measurement and terminal signal transmission based on coexistence between different systems based on cellular communication using licensed shared bands.

In accordance with an aspect of the present disclosure, a communication method of a terminal is provided. The method includes receiving, from a base station (BS), configuration information of DRX, performing beam measurement before a start of an on duration of the DRX, transmitting, to the BS, beam feedback information according to the beam measurement result, and performing a predetermined operation after transmitting the beam feedback information.

In the method, the performing of the predetermined operation includes monitoring downlink data before the start of the on duration of the DRX.

In the method, the performing of the predetermined operation includes determining whether a message indicating the BS has downlink data to transmit is received from the BS, and if the message is received from the BS, monitoring downlink data before the start of the on duration of the DRX.

In the method, the performing of the predetermined operation further includes if the message is not received from the BS, skipping the monitoring of the downlink data during the on duration of the DRX.

In the method, the performing of the predetermined operation further includes if the message is not received from the BS, monitoring downlink data from the start of the on duration of the DRX.

In the method, the performing of the predetermined operation includes if the message indicating the BS has downlink data to transmit is received from the BS, monitoring downlink data from the start of the on duration of the DRX, and if the message is not received from the BS, skipping the monitoring of the downlink data during the on duration of the DRX.

In accordance with another aspect of the present disclosure, a communication method of a BS is provided. The method includes transmitting, to a terminal, configuration information of DRX, receiving, from the terminal, beam feedback information according to beam measurement before a start of an on duration of the DRX, and if the BS has downlink data to transmit, transmitting, to the terminal, a message indicating that the BS has downlink data to transmit.

In the method, the method further includes transmitting, to the terminal, the downlink data before the start of the on duration of the DRX and after receiving the beam feedback information.

In accordance with another aspect of the present disclosure, a terminal is provided. The terminal includes a transceiver configured to receive and transmit a signal, and at least one processor configured to receive, from a BS, configuration information of DRX, perform beam measurement before a start of an on duration of the DRX, transmit, to the BS, beam feedback information according to the beam measurement result, and perform a predetermined operation after transmitting the beam feedback information.

In accordance with another aspect of the present disclosure, a BS is provided. The BS includes a transceiver configured to receive and transmit a signal, and at least one processor configured to transmit, to a terminal, configuration information of DRX, receive, from the terminal, beam feedback information according to beam measurement before a start of an on duration of the DRX, and if the BS has downlink data to transmit, transmit, to the terminal, a message indicating that the BS has downlink data to transmit.

In a feature of the present disclosure, it is possible to provide an enhanced DRX operation of the MS considering the beam forming.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 15 illustrates data sent using a TX beam reported during last wake up according to an embodiment of the present disclosure;

FIG. 25A illustrates a DRX cycle according to an embodiment of the present disclosure;

FIG. 26 illustrates a DRX cycle according to an embodiment of the present disclosure;

Throughout the drawings, it should be noted that like reference numbers are used to depict the same or similar elements, features, and structures.

DETAILED DESCRIPTION

Figure 1:
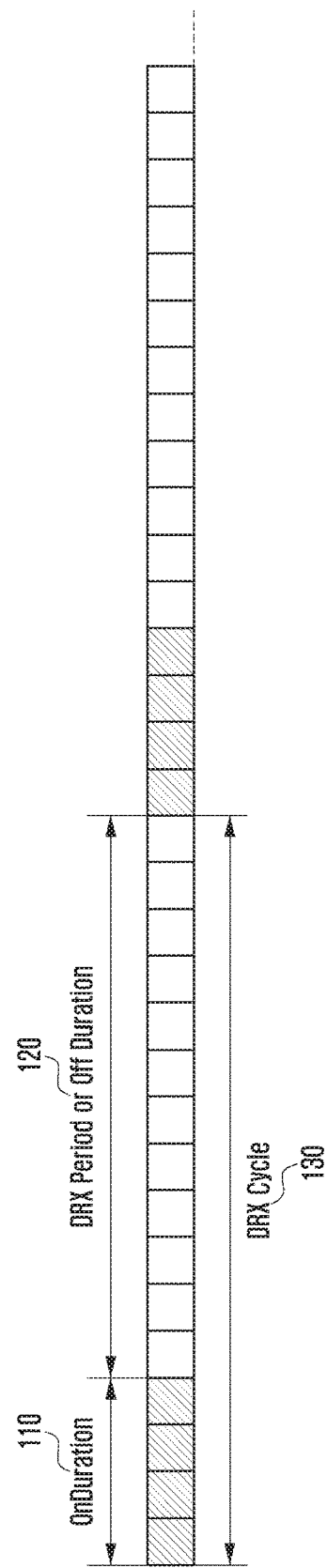
FIG. 1 illustrates a discontinuous reception (DRX) cycle according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the drawings, some elements are exaggerated, omitted, or only outlined in brief, and thus may be not drawn to scale. The same or similar reference symbols are used throughout the drawings to refer to the same or like parts.

Meanwhile, it is known to those skilled in the art that blocks of a flowchart (or sequence diagram) and a combination of flowcharts may be represented and executed by computer program instructions. These computer program instructions may be loaded on a processor of a general-purpose computer, special purpose computer or programmable data processing equipment. When the loaded program instructions are executed by the processor, they create a means for carrying out functions described in the flowchart. As the computer program instructions, may be stored in a computer readable memory that is usable in a specialized computer or a programmable data processing equipment, it is also possible to create articles of manufacture that carry out functions described in the flowchart. As the computer program instructions, may be loaded on a computer or a programmable data processing equipment, when executed as processes, they may carry out operations of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component, such as a field-programmable gate array (FPGA) or application specific integrated circuits (ASIC) capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card. A component or unit may include one or more processors.

Prior to the detailed description, terms or definitions necessary to understand the present disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), or 5G NB (5GNB). More particularly, in a heterogeneous network including primary BSs and secondary BSs, which serves as the main background of the present disclosure, the primary BS may be referred to as macro BS, primary BS, or primary cell (PCell), and the secondary BS may be referred to as a small BS, a secondary BS, or a secondary cell (SCell).

The "UE" is an entity communicating with a BS and may be referred to as UE, device, mobile station (MS), mobile equipment (ME), or terminal.

Figure 2:
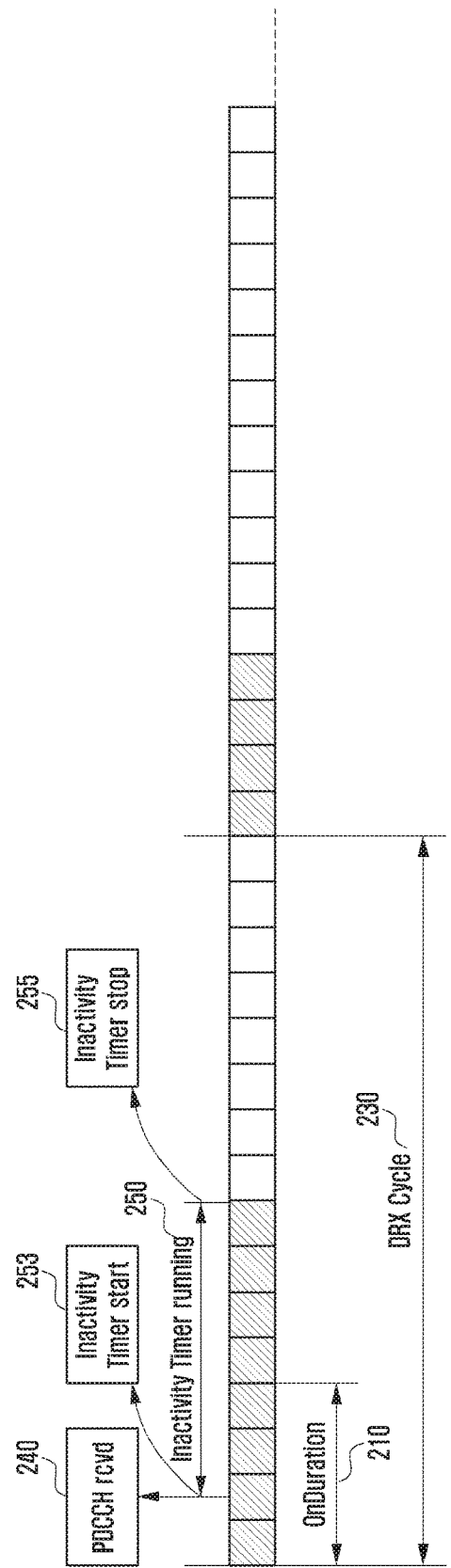
FIG. 2 illustrates an inactivity timer operation in a DRX cycle according to an embodiment of the present disclosure.

FIG. 1 illustrates a discontinuous reception (DRX) cycle, and FIG. 2 illustrates an inactivity timer operation in a DRX cycle according to an embodiment of the present disclosure.

In the recent years, several broadband wireless technologies have been developed to meet the growing number of broadband subscribers and to provide more and better applications and services. The second-generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation (4G) wireless communication system suffers from lack of resources to meet the growing demand for high speed data services.

A method of providing a generally high data transmission rate includes a method of providing communication using a wider frequency band and a method of increasing frequency usage efficiency. However, it is very difficult to provide a higher average data rate through the latter method. This is because communication technologies of a current generation provide frequency usage efficiency close to a theoretical limit and thus, it is very difficult to increase the frequency usage efficiency up to that or more through a technical improvement. Accordingly, it can be said that a feasible method for increasing the data transmission rate is a method of providing data services through the wider frequency band. At this time, the thing to consider is an available frequency band. In view of the current frequency distribution policy, a band in which a broadband communication of 1 GHz or more is possible is limited and a practically selectable frequency band is only the millimeter wave band of 30 GHz or more. Such a signal of the high frequency band causes severe signal attenuation according to a distance differently from a signal of a frequency band of 2 GHz used by the cellular systems according to the related art. Due to such signal attenuation, service providing coverage area of a BS using the same power as the cellular systems of the related art will be considerably reduced. In order to address this issue, a beam forming technique is widely used which concentrates transmission/reception power into a narrow space to increase transmission/reception efficiency of an antenna.

Typically, in a wireless communication network UE can be in one of radio resource control (RRC) idle state or RRC connected state. A UE in RRC idle performs cell selection and reselection—in other words, it decides on which cell to camp. The RRC idle UE monitors a paging channel to detect incoming calls, and also acquires system information. The system information mainly consists of parameter by which network can control the cell (re)selection process. In RRC connected state, network allocates radio resources to the UE to facilitate the transfer of (unicast) data via shared data channels. To support this operation, the UE monitors an associated control channel used to indicate the dynamic allocation of the shared transmission resources in time and frequency. The UE provide the network with reports of its buffer status and of the downlink channel quality, as well as neighbor cell measurement information to enable network to select the most appropriate cell for the UE.

Referring to FIG. 1, to extend its battery life, a UE in RRC connected state may be configured with a DRX cycle 130. DRX functionality can be configured for an RRC connected UE so that it does not always need to monitor the downlink channels. A DRX cycle 130 consists of an 'On Duration' 110 during which the UE should monitor the scheduling channel i.e., physical downlink common control channel (PDCCH) and a 'DRX Period' 120 during which a UE can skip reception of downlink channels for battery saving purposes.

Referring to FIG. 2, a UE checks for scheduling messages during the 'On Duration' period 210 of DRX cycle 230. When a scheduling message is received (240) during the 'On Duration' 210, the UE starts a 'DRX Inactivity Timer' (253), and monitors the PDCCH in every subframe while the 'DRX Inactivity Timer' is running (250) (that is, before the DRX inactivity timer is stopped (255)). During this period 250 UE can be regarded as being in a continuous reception mode. Whenever a scheduling message is received while the 'DRX Inactivity Timer is running' (250), the UE restarts the 'DRX Inactivity Timer' and when it expires UE moves into DRX mode. The 'On Duration' 210 configured by network can get extended because of 'DRX Inactivity Timer'. While the 'DRX Inactivity Timer' is running (250) or during the 'On Duration' 210, network can send command to UE to enter DRX period early.

A DRX operation of the MS considering the beam forming has not been discussed much.

For beam forming, a UE measures the reference signals (RSs) transmitted by the BS using beamforming to determine the best downlink (DL) transmitting (TX) beam and corresponding best receiving (RX) beam. Let's say there are N TX beams at the BS and M RX beams at the MS. The BS transmits RS using N TX beams wherein each TX beam is repeated M times. The UE will try to receive each of N TX beams using each RX beam during the beam measurement duration. Beam measurement duration is configured to the UE depending on number of RX beams at the UE and time taken by BS to transmit N TX beams. After performing the measurement, the UE reports the measurement result (e.g., DL best TX beam) to the BS. In addition, during the 'On Duration' the UE monitors the DL channels and receives the DL data scheduled by the BS using the beam indicated in beam feedback.

For the power saving, determining the beam measurement time and the beam feedback time during DRX is needed. So, an enhanced DRX operation of the MS considering the beam forming is needed.

Figure 3:
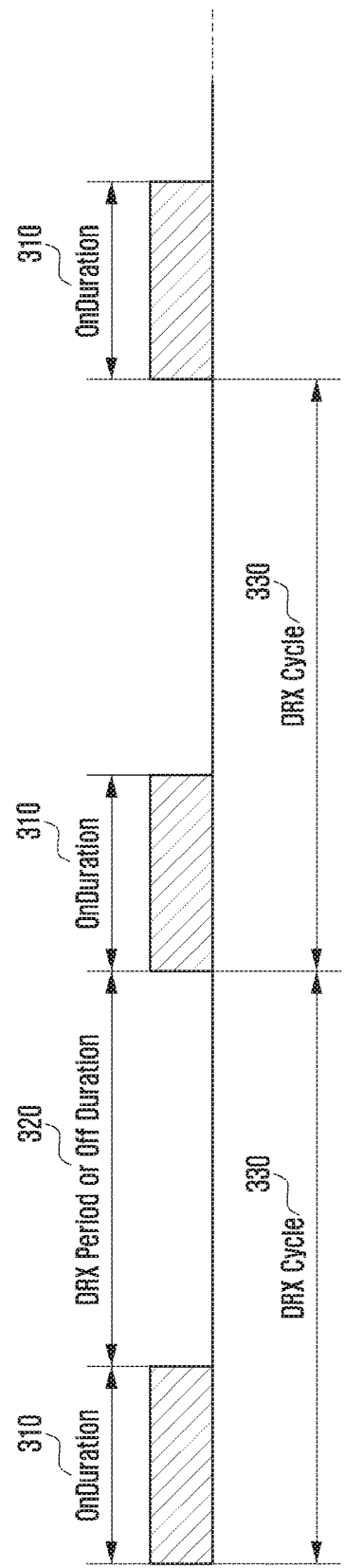
FIG. 3 illustrates a DRX cycle according to an embodiment of the present disclosure.

Method 1:

FIG. 3 illustrates a DRX cycle according to an embodiment of the present disclosure.

In one method of disclosure it is proposed that in a beam formed wireless communication system, a UE in RRC connected state may be configured with a DRX cycle as shown in FIG. 3. A DRX cycle 330 consists of an 'On Duration' 310 and a 'DRX Period' 320. The length of DRX cycle 330, length of 'On Duration' 310 and start of DRX cycle 330 is configured to the UE by the network (e.g., BS) in signaling message. During the DRX period 320, the UE can skip reception of downlink channels for battery saving purposes.

Embodiment 1

Figure 4:
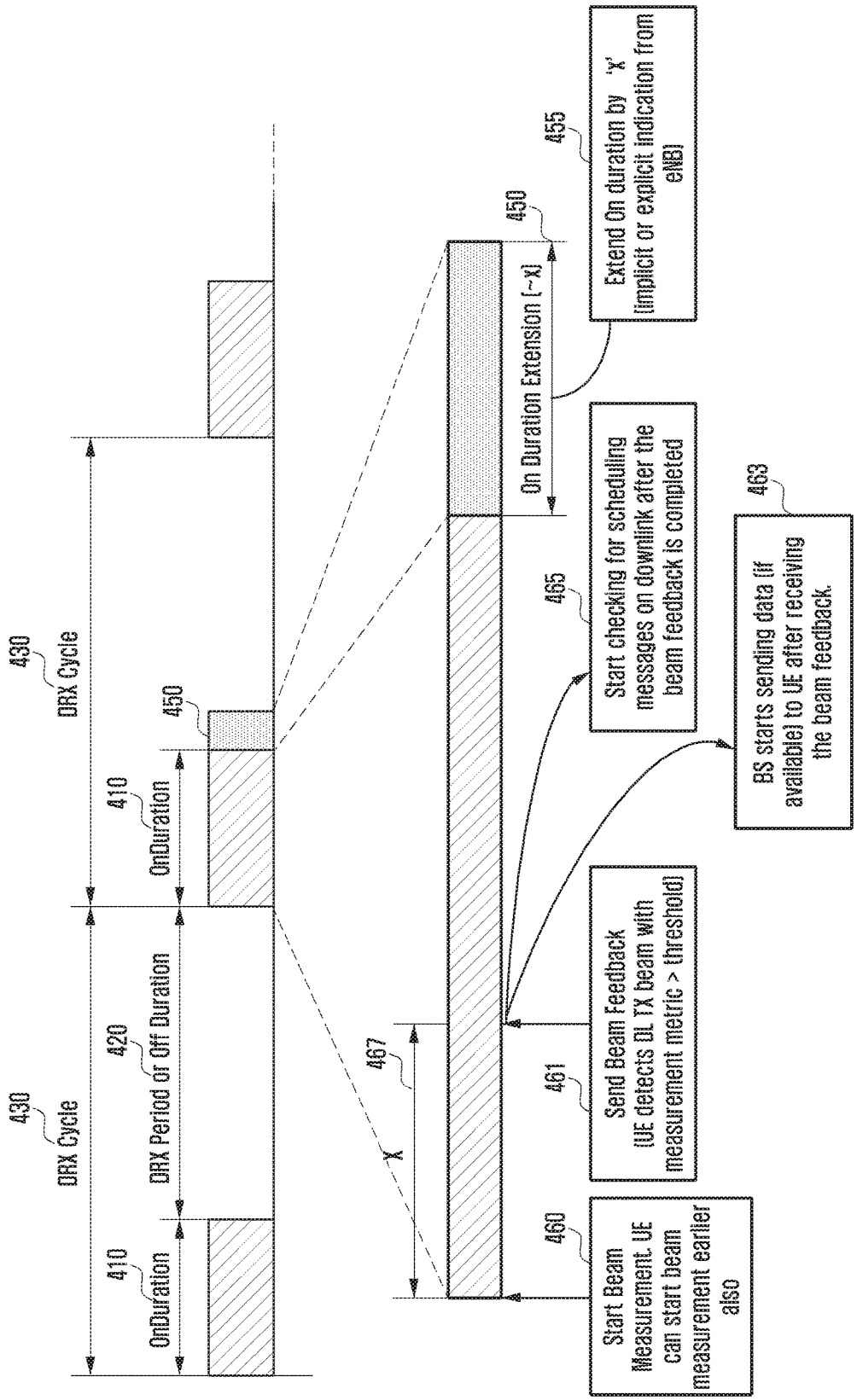
FIG. 4 illustrates a DRX cycle according to an embodiment of the present disclosure.

FIG. 4 illustrates a DRX cycle according to an embodiment of the present disclosure.

Figure 5:
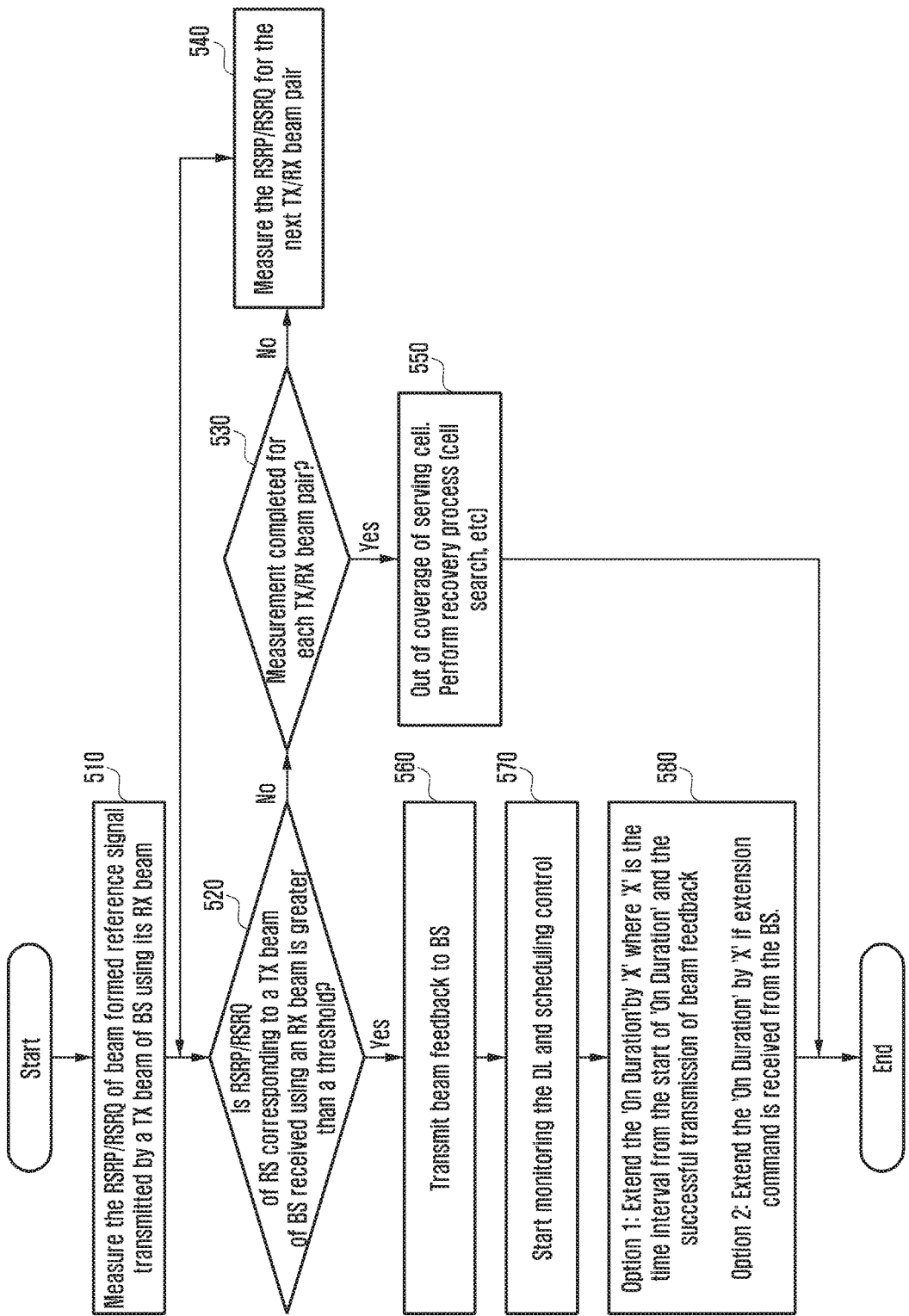
FIG. 5 illustrates a flowchart for beam forming during a DRX operation of a user equipment (UE) according to an embodiment of the present disclosure.

FIG. 5 illustrates a flowchart for beam forming during a DRX operation of a UE according to an embodiment of the present disclosure.

Figure 6:
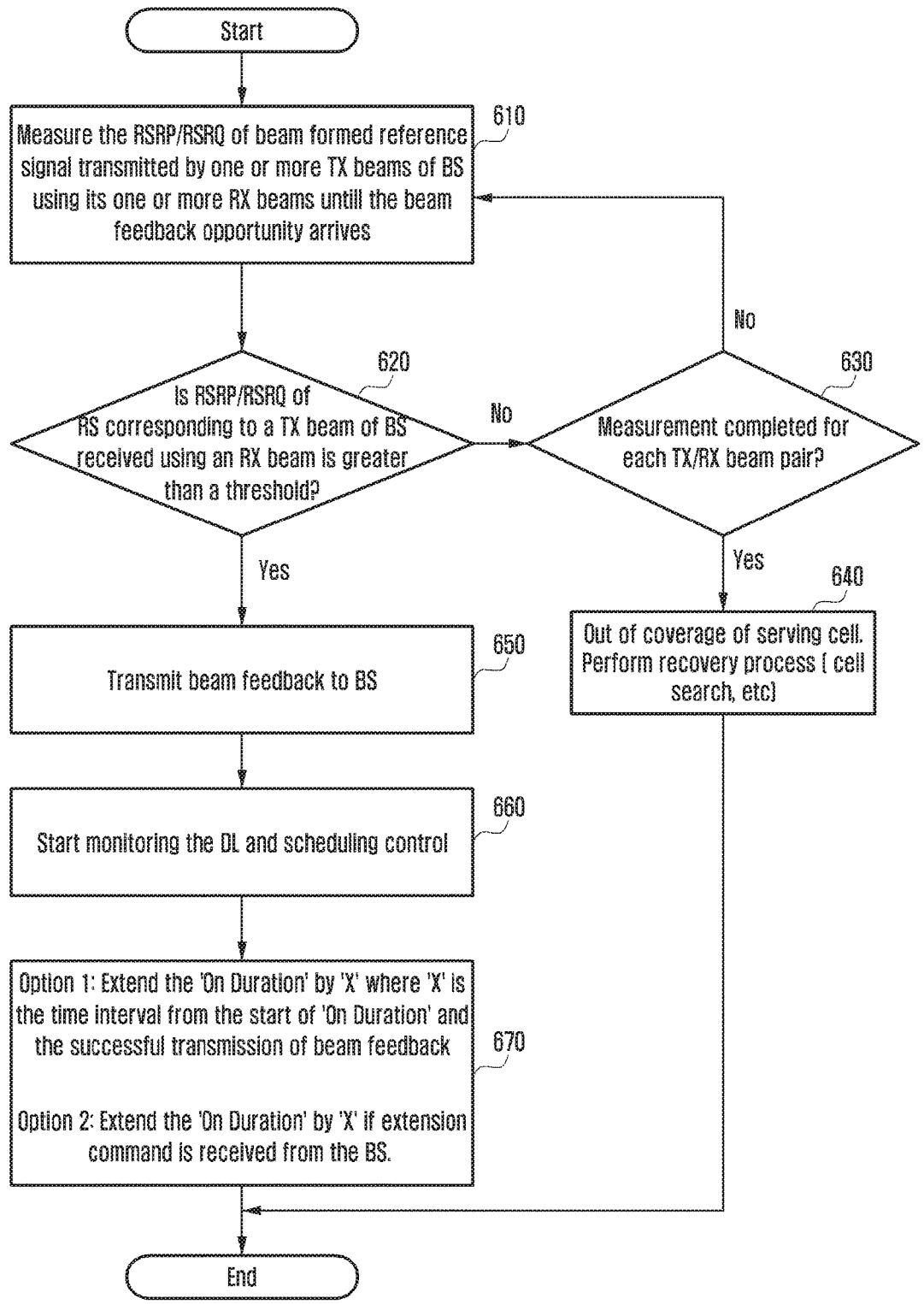
FIG. 6 illustrates a flowchart for beam forming during a DRX operation of a UE according to an embodiment of the present disclosure.

FIG. 6 illustrates a flowchart for beam forming during a DRX operation of a UE according to an embodiment of the present disclosure.

Figure 7:
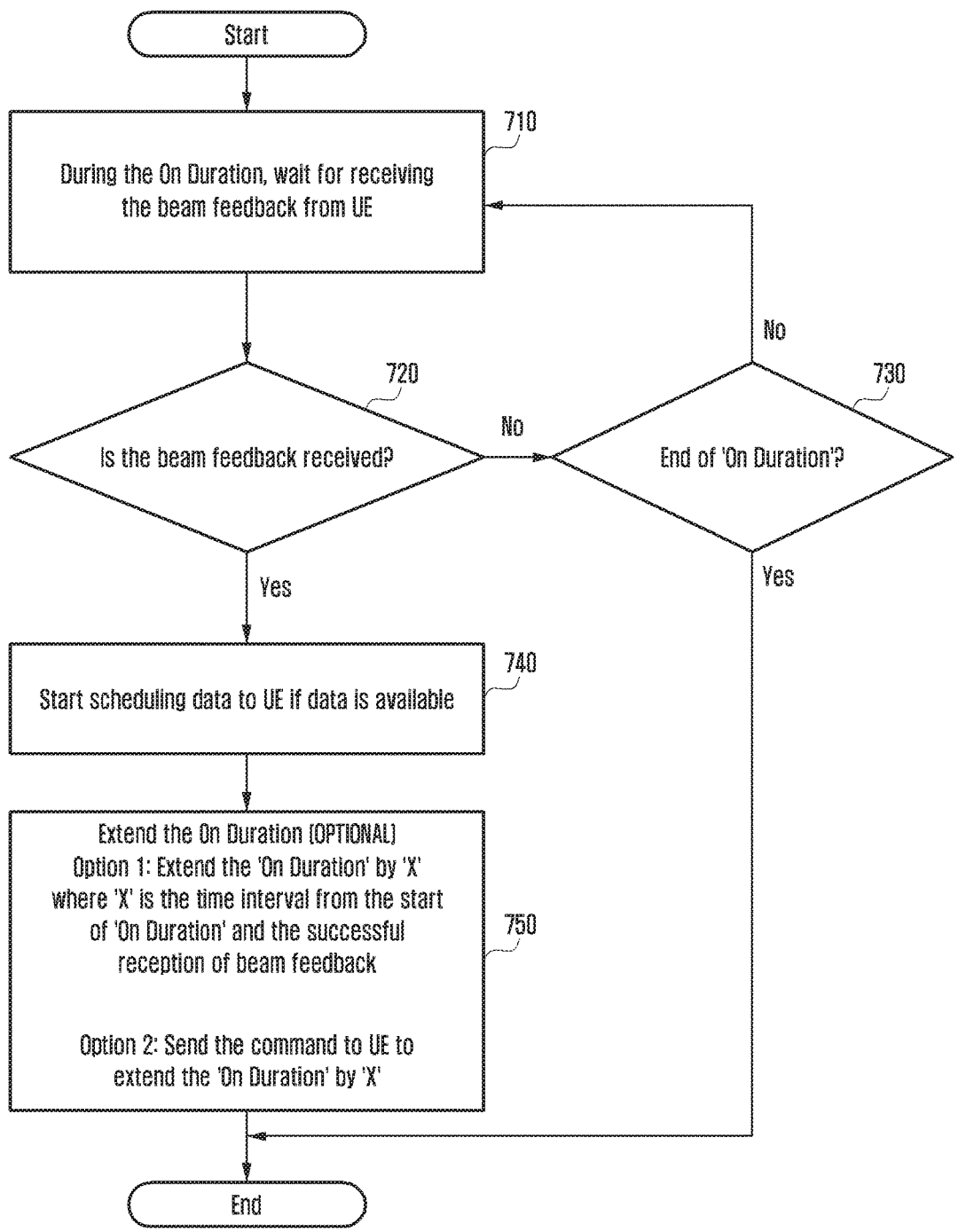
FIG. 7 illustrates a flowchart for beam forming during a DRX operation of a base station (BS) according to an embodiment of the present disclosure.

FIG. 7 illustrates a flowchart for beam forming during a DRX operation of a BS according to an embodiment of the present disclosure.

Referring to FIG. 4, a UE operation during the 'On Duration' 410 is illustrated in FIG. 4. A DRX cycle 430 consists of an 'On Duration' 410 and a 'DRX Period' 420. At the start of 'On Duration' 410 UE start beam measurement (i.e., measuring the beam formed RS, beam formed channel state information RS (CSI-RS), or synchronization signal (SS) transmitted by the BS) (at operation 460). Alternately, UE may start measurement before the start of 'On Duration' 410. And the beam feedback is sent during the 'On Duration' 410 (at operation 461). The beam feedback may be sent even before the 'On Duration' 410. At operation 461, in one embodiment, the UE checks whether the detected DL TX beam is greater than a threshold, and, if the detected DL TX beam is greater than a threshold, the UE transmit the beam feedback to the BS. At operation 463 the BS starts sending data (if available) to the UE after receiving the beam feedback from the UE, and at operation 465 the UE starts checking for scheduling message on downlink after the beam feedback is completed.

Referring to FIG. 5, at operation 510, the UE measures the RS received power (RSRP)/RS received quality (RSRQ) of RS/synchronization signal (SS) transmitted by each TX beam of BS using its each RX beam. The UE may start receiving the RS transmitted by each TX beam using best RX beam of the previous DRX cycle, and then receive the RS transmitted by each TX beam using other RX beams sequentially. Alternately, the UE may receive the RS transmitted by each TX beam using RX beams in any order. For example, let's say there are 10 TX beams (TX1 to TX 10) and 4 RX beams (RX1 to RX 4). The UE first receives TX beams TX 1 to TX 10 using RX beam RX1, then the UE receives TX beams TX 1 to TX 10 using RX beam RX2, then UE receives TX beams TX 1 to TX 10 using RX beam RX3 and then the UE receives TX beams TX 1 to TX 10 using RX beam RX4. In an alternate embodiment, the UE may receive one TX beam using all RX beams, then another TX beam using all RX beams and so on.

In another embodiment, the BS may transmit RS/SS using Omni beam in addition to transmitting RS using the narrow beams. The UE in this case first measure the RS transmitted by Omni beam using each RX beam. The best RX beam is then used to receive RS transmitted by each narrow TX beam. Omni beam can be transmitted in same time slots as narrow TX beams or it can be transmitted in separate time slots.

After receiving RS corresponding to a TX beam of the BS using an RX beam and measuring the RSRP/RSRQ/continuous quality (CQI)/signal-to-interference-plus-noise ratio (SINR)/signal-to-noise ratio (SNR) of received RS, at operation 520, the UE checks whether RSRP/RSRQ/CQI/SINR/SNR is greater than a 'threshold' (or RSRP/RSRQ/CQI/SINR/SNR>='threshold'). The 'threshold' may be predefined or signaled by network (e.g., the BS) in broadcast signaling or signaled to the UE in dedicated signaling. The 'threshold' may be signaled as part of DRX configuration.

If yes, then the UE perform the following:

At operation 560, the UE sends beam feedback to the BS, In one embodiment, the beam feedback can be sent using random access (dedicated or contention based) or using dedicated radio resources configured for beam feedback, or using the dedicated SR followed by beam feedback, or any subframe which the BS receives signals by sweeping BS's rx beams while the UE can transmit preamble without the BS's scheduling, or any available subframe which is scheduled by the BS to transmit beam feedback. The dedicated resources for beam feedback may be periodically configured during the 'On Duration' 410 and signaled to the UE. The beam feedback may include the information (e.g., beam id, RSRP/RSRQ/CQI/SINR/SNR, CQI, and the like) about best DL TX beam detected so far. In one embodiment, instead of explicitly sending the beam feedback, the UE may initiate random access, and as part of random access procedure the BS will come to know about the best or suitable DL TX beam. For example, RA (random access) preamble or MSG3 may indicate DL TX beam or TX beam can be same as RX beam through which the BS receives the RA preamble.

After sending the beam feedback successfully (or after receiving the beam switching indication or N subframes after receiving the beam switching indication or from subframe indicated in beam switching indication or N subframes after sending beam feedback successfully, or after the UE changes beam), at operation 570, the UE start monitoring the downlink and check for scheduling messages (i.e., (E) PDCCH). If the BS has data to transmit, the BS will start transmitting data to the UE after receiving the beam feedback (or after transmitting the beam switching indication or N subframes after transmitting the beam switching indication or from subframe indicated in beam switching indication or N subframes after receiving beam feedback successfully, or after the BS changes beam). Until the UE sends the first beam feedback in the 'On Duration' 410, the UE does not start monitoring the downlink and check for scheduling messages (i.e., (E) PDCCH). Until the BS receives the first beam feedback in the 'On Duration' 410, the BS does not schedule data (if available) to the UE during the 'On Duration' 410. In another embodiment, after sending the beam feedback successfully (or after receiving the beam switching indication or N subframes after receiving the beam switching indication or from subframe indicated in beam switching indication or N subframes after sending beam feedback successfully, or after the UE changes beam), and transmitting the CQI successfully, the UE start monitoring the downlink and check for scheduling messages (i.e., (E) PDCCH). If the BS has data to transmit, the BS will start transmitting data to the UE after receiving the beam feedback and CQI.

Then, at operation 580, in one embodiment, the UE extends the 'On Duration' by 'x' 450 (at operation 455 in FIG. 4), wherein 'x' 450 is the time 467 consumed by UE in beam measurement and sending the beam feedback successfully. The 'x' is measured from the start of 'On Duration'. In another embodiment, instead of the UE implicitly extending the 'On Duration' 410, 450, the BS after receiving the beam feedback may signal the UE whether to extend 'On Duration' or not. The amount of extension can be 'x' 450 or any value signaled by network (e.g., the BS).

In another embodiment, the UE extends the 'On Duration' 410 by 'x' 450, wherein 'x' 450 is the time 467 consumed by the UE in beam measurement and sending the beam feedback successfully and CQI. The 'x' is measured from the start of 'On Duration'. In another embodiment, instead of the UE implicitly extending the 'On Duration' 410, 450, the BS after receiving the beam feedback and CQI may signal the UE whether to extend 'On Duration' or not. The amount of extension can be 'x' 450 or any value signaled by network.

In an alternate embodiment of the disclosure, until the UE sends beam feedback (or if there is no beam change required) using the configured dedicated or common resources, the UE can start monitoring the downlink and check for scheduling messages (i.e., (E) PDCCH) from the start of 'On Duration' 410 using the last (i.e., in previous DRX cycle) reported TX beam and corresponding RX beam. If the BS has data to transmit it may start transmitting data to the UE using the last (i.e., in previous DRX cycle) reported TX beam before receiving the beam feedback from the UE.

In an alternate embodiment, in order the UE to not monitor DL channel before UL feedback transmission, the network may signal an indication (i.e., one-bit to allow such postponed DL monitoring until UL beam feedback transmission, or fixed/maximum/minimum/mean duration of 'X' for the UE to postpone monitoring DL before UL beam feedback in terms of time/number of sub-frames/number of slots/number of symbols/number of hybrid automatic repeat request (HARQ) durations, or information to deduce the possible maximum DL monitoring duration which can be postponed before UL beam feedback as 'X' in terms of the number of BS beams, the periodicity of RSs for such BS beams, the number of beams transmitted in a period).

In addition, if the RSRP/RSRQ/CQI/SINR/SNR is not greater than a 'threshold', at operation 530, the UE determines whether the measurement is completed for each TX/RX beam pair.

If the measurement is completed for each TX/RX beam pair, at operation 550, the UE determines that the UE is out of coverage area of a serving cell. Then the UE may perform recovery process (for example, cell search, and the like). In addition, if the measurement is not completed for each TX/RX beam pair, at operation 540, the UE measures the RSRP/RSRQ/CQI/SINR/SNR for the next TX/RX beam pair, and go to the operation 520.

In an alternate embodiment, beam feedback opportunity during the 'On Duration' 410 may be limited (i.e., may not be available immediately after receiving RS corresponding to a TX beam and measuring the RS). The UE operation in this case is illustrated in FIG. 6.

Referring to FIG. 6, instead of determining a TX beam with RSRP/RSRQ/CQI/SINR/SNR greater than a threshold (or RSRP/RSRQ/CQI/SINR/SNR>=Threshold) after measuring the RSRP/RSRQ/CQI/SINR/SNR of RS corresponding to a TX beam of the BS and the UE's RX beam, at operation 610, the UE can perform measurements until the time beam feedback opportunity arrive during 'On Duration'. For example, the UE may perform measurements the RSRP/RSRQ/CQI/SINR/SNR of beam formed RS transmitted by one or more TX beams of the BS using its one or more RX beams until the beam feedback opportunity arrives.

Then, at operation 620, the UE determines if there is any TX beam amongst all measurement done so far whose RSRP/RSRQ/CQI/SINR/SNR is greater than a Threshold (or RSRP/RSRQ/CQI/SINR/SNR>=Threshold).

If UE find a TX beam, then UE perform the following:

At operation 650, the UE sends beam feedback to the BS. In one embodiment, beam feedback can be sent using random access (dedicated or contention based) or using dedicated radio resources configured for beam feedback or using dedicated SR followed by beam feedback, or any subframe which the BS receives signals by sweeping BS's RX beams while the UE can transmit preamble without the BS's scheduling, or any available subframe which is scheduled by the BS to transmit beam feedback. The dedicated resources for beam feedback may be periodically configured during the 'On Duration' 410 and signaled to the UE. The beam feedback may include the information (e.g., beam id, RSRP/RSRQ/CQI/SINR/SNR, and the like) about best DL TX beam detected so far.

After sending the beam feedback successfully (or after receiving the beam switching indication or N subframes after receiving the beam switching indication or from subframe indicated in beam switching indication or N subframes after sending beam feedback successfully, or after the UE changes beam), at operation 660, the UE start monitoring the downlink and check for scheduling messages (i.e., (E) PDCCH). If the BS has data to transmit, the BS will start transmitting data to the UE after receiving the beam feedback (or after transmitting the beam switching indication or N subframes after transmitting the beam switching indication or from subframe indicated in beam switching indication or N subframes after receiving beam feedback successfully, or after the BS changes beam). Until the UE sends the first beam feedback in the 'On Duration', the UE does not start monitoring the downlink and check for scheduling messages (i.e., (E) PDCCH). Until the BS receives the first beam feedback in the 'On Duration', the BS does not schedule data (if available) to the UE during the 'On Duration'. In another embodiment, after sending the beam feedback successfully and transmitting the CQI successfully, the UE start monitoring the downlink and check for scheduling messages (i.e., (E) PDCCH). If the BS has data to transmit, the BS will start transmitting data to the UE after receiving the beam feedback and CQI.

Then, at operation 670, in one embodiment, the UE extends the 'On Duration' 410 by 'x' 450, wherein 'x' 450 is the time 467 consumed by the UE in beam measurement and sending the feedback. The 'x' is measured from the start of 'On Duration'. In another embodiment, instead of the UE implicitly extending the 'On Duration', the BS after receiving the beam feedback may signal the UE whether to extend 'On Duration' or not. The amount of extension can be 'x' 450 or any value signaled by network.

In another embodiment, the UE extends the 'On Duration' 410 by 'x' 450, wherein 'x' 450 is the time 467 consumed by the UE in beam measurement and sending the beam feedback and CQI. The 'x' is measured from the start of 'On Duration'. In another embodiment, instead of the UE implicitly extending the 'On Duration', the BS after receiving the beam feedback and CQI may signal the UE whether to extend 'On Duration' or not. The amount of extension can be 'x' 450 or any value signaled by network.

In addition, if the RSRP/RSRQ/CQI/SINK/SNR is not greater than a 'threshold', at operation 630, the UE determines whether the measurement is completed for each TX/RX beam pair.

If the measurement is completed for each TX/RX beam pair, at operation 640, the UE determines that the UE is out of coverage area of the serving cell. Then the UE may perform recovery process (for example, cell search, and the like). In addition, if the measurement is not completed for each TX/RX beam pair, the UE go to the operation 610.

The BS operation in this embodiment of the disclosure is illustrated in FIG. 7.

Referring to FIG. 7, at operation 7, the BS waits for receiving the beam feedback from the UE during the on duration 410. In addition, at operation 720, the BS determines whether the beam feedback is received from the UE.

If the beam feedback is not received from the UE, at operation 730, the BS determines whether the on duration is ended. And if the on duration is not ended, the BS goes to operation 710, and waits for receiving the beam feedback from the UE. However, if the on duration is ended, the operation is end.

If the beam feedback is received from the UE, at operation 740, the BS starts scheduling data to the UE if data is available.

At operation 750, the BS may extend the 'On Duration' 410 by 'x' 450, wherein 'x' 450 is the time 467 consumed by the UE in beam measurement and sending the beam feedback. In another embodiment, the BS after receiving the beam feedback may signal the UE whether to extend 'On Duration' or not. The amount of extension can be 'x' 450 or any value signaled by the BS.

In another embodiment, the BS may extend the 'On Duration' 410 by 'x' 450, wherein 'x' 450 is the time 467 consumed by the UE in beam measurement and sending the beam feedback and CQI. In another embodiment, the BS after receiving the beam feedback and CQI may signal the UE whether to extend 'On Duration' or not. The amount of extension can be 'x' 450 or any value signaled by BS.

The operation 750 is optional operation.

In the UE operation and the BS operation of embodiment 1, it is assumed that the length of 'On Duration' configured by network is greater than time required by the UE to receive the RS/SS for beam measurement using all TX beams and RX beams and time to send the beam feedback. Network sets the length of 'On Duration' greater than or equal to time required by the UE to receive the RS/SS for beam measurement using all TX beams and RX beams and time to send the beam feedback.

Figure 8:
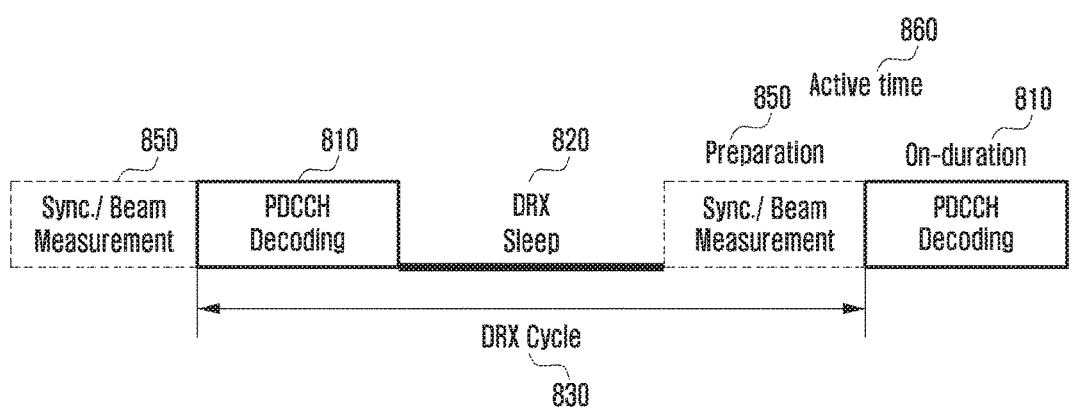
FIG. 8 illustrates a DRX operation according to an embodiment of the present disclosure.

FIG. 8 illustrates a DRX operation according to an embodiment of the present disclosure.

1. Referring to FIG. 8, a DRX cycle 830 consists of an 'On Duration' 810 and a 'DRX Period' 820. The UE may start beam measurement 850 before an on duration 810 starts. In this case, the 'active time' 860 of the UE is extended before the actual on duration 810 starts.

In one embodiment, the beam measurement duration 850 may be the BS indicated

In another embodiment, the beam measurement duration 850 may be the UE decided

In one embodiment, the beam measurement duration 850 may not be overlapped with the on-duration 810.

In one embodiment, the beam measurement duration 850 may be overlapped (partially or fully) with the on-duration 810.

2. The UE may transmit beam feedback by following the beam feedback channel and procedures. Considering candidates are as follows:

beam feedback using the BS allocated resource:
   the BS allocates a resource (persistent, semi-persistent, instantaneous) for beam feedback of a specific UE, using the known best beam of the UE.

If the best beam condition is good enough to communicate, the UE can use the resource for beam feedback transmission This resource allocation based beam feedback
   beam feedback using non-scheduled resource:
      the UE may transmit measurement report using extra physical random access channel (xPRACH), a random access based access channel 3. The UE may transmit beam feedback right after detecting a suitable beam during the beam measurement.
   beam feedback using the BS allocated resource within an on-duration
   In this case, the beam measurement is also ongoing within an on-duration
   beam feedback using non-scheduled resource
   suitable beam corresponds to a beam which has measurement RSRP (or RSRQ, CQI, SINK, SNR) above a threshold which configured 4. The BS may defer transmitting downlink data after any beam feedback reception:
   for accurate data transmission and reduce the waste of resource and power in case when the downlink transmission before beam feedback is not received successfully.

5. The UE may decode xPDCCH after beam feedback transmission
   for accurate data reception and reduce the waste of power in case when the downlink transmission before beam feedback is not received successfully.

6. The BS may extend on duration by implicit or explicit indication
   to compensate beam measurement and feedback time Embodiment 2

Figure 9:
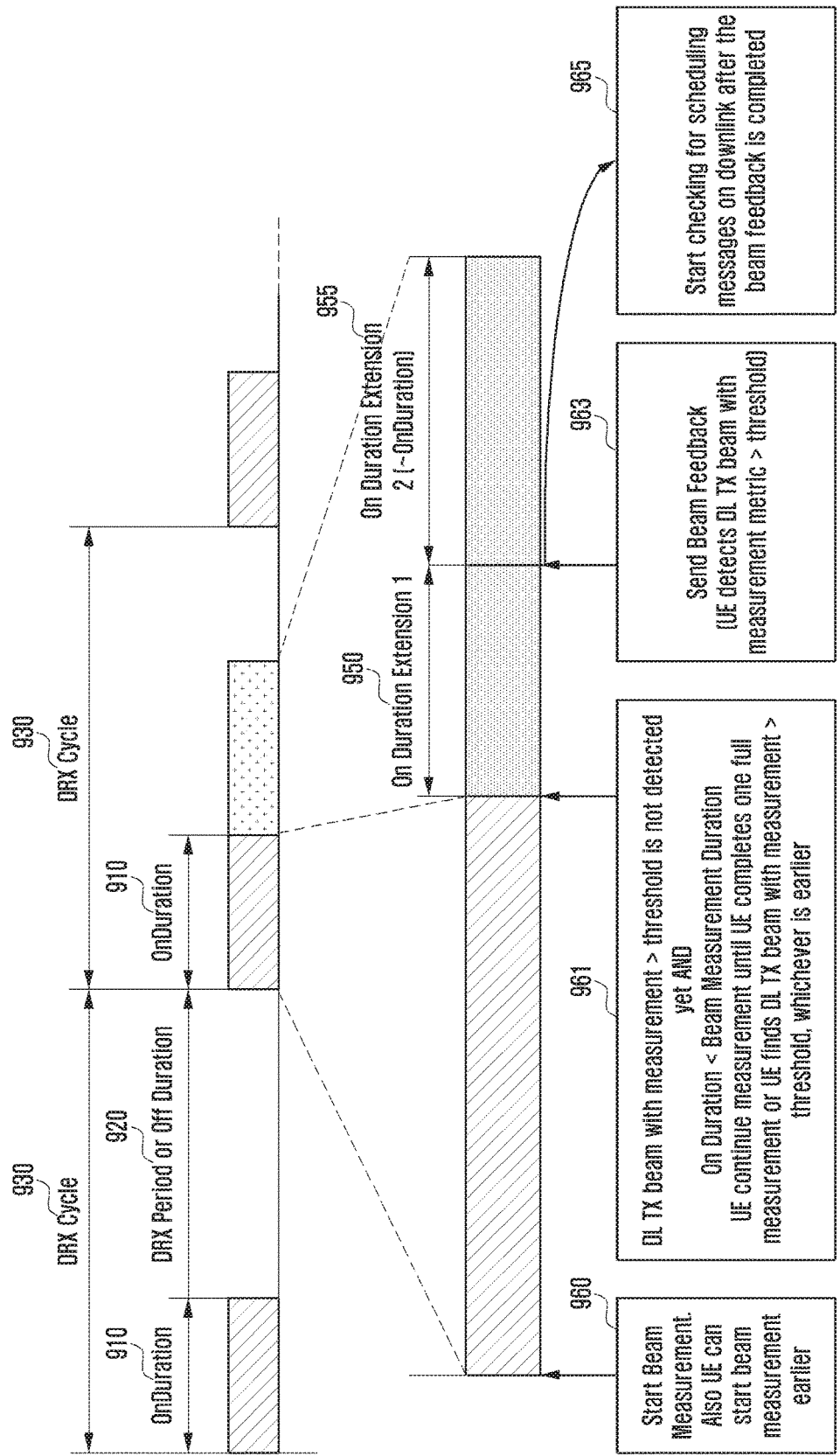
FIG. 9 illustrates a DRX cycle according to an embodiment of the present disclosure.

FIG. 9 illustrates a DRX cycle according to an embodiment of the present disclosure.

Figure 10:
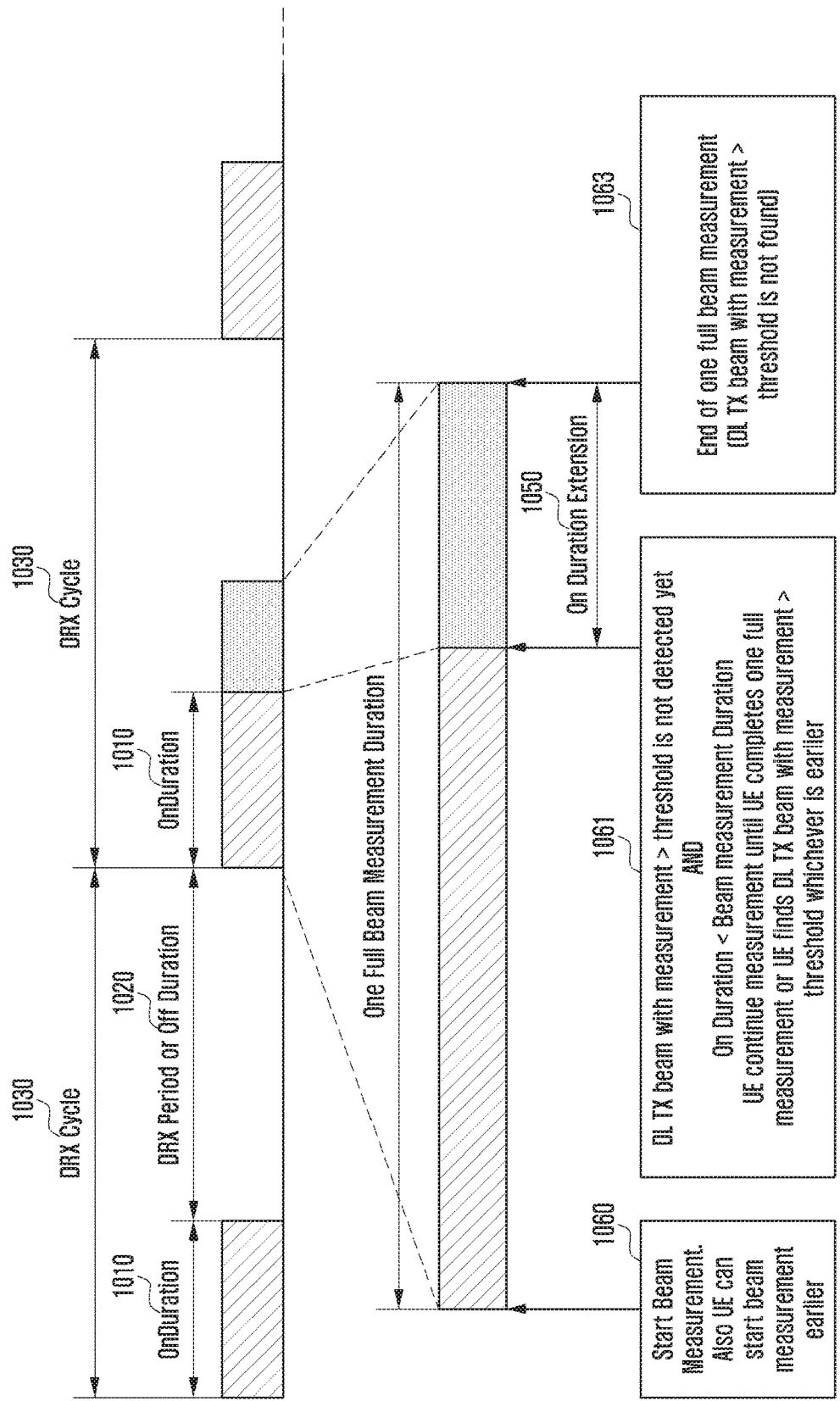
FIG. 10 illustrates a DRX cycle according to an embodiment of the present disclosure.

FIG. 10 illustrates a DRX cycle according to an embodiment of the present disclosure.

Figure 11:
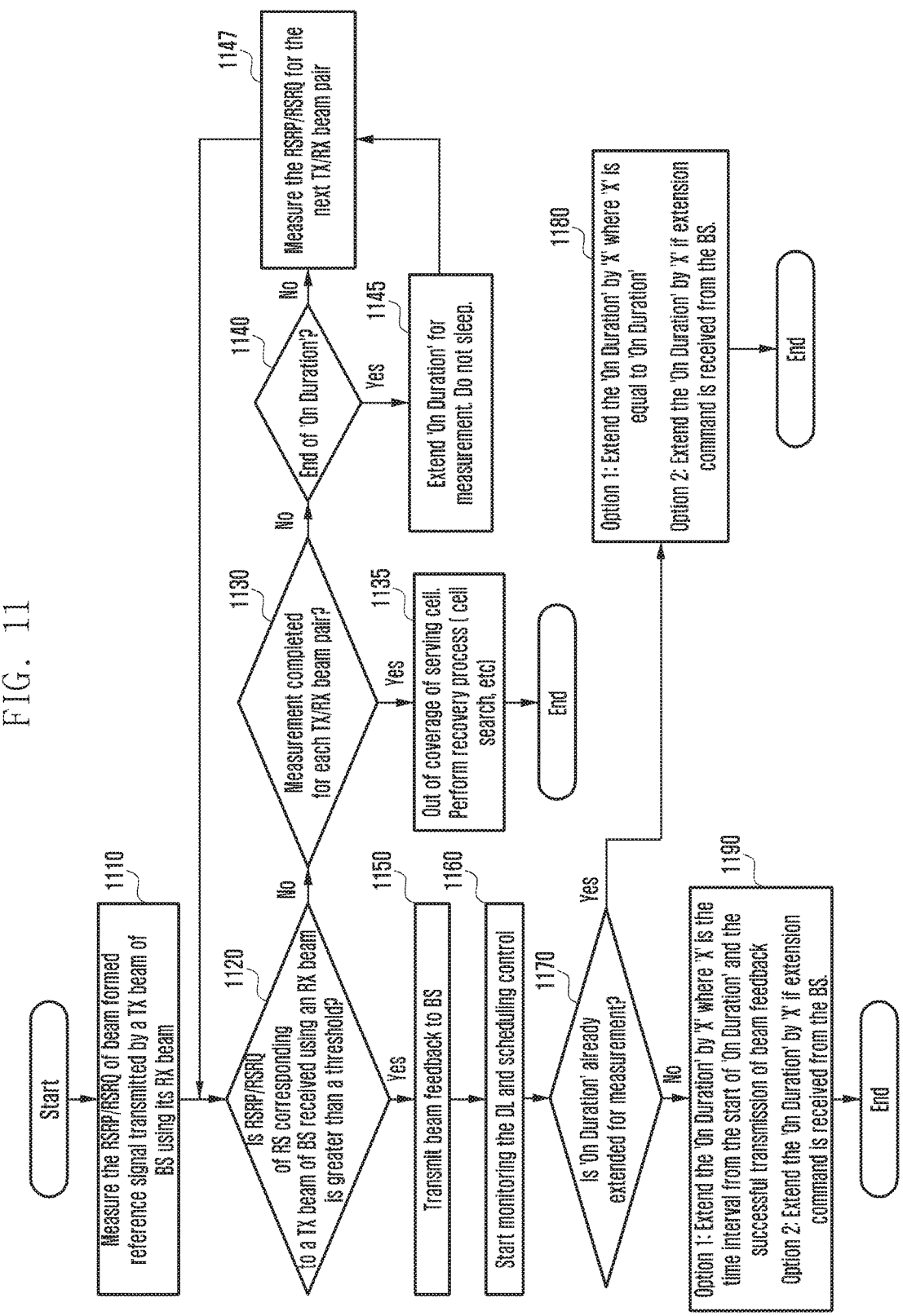
FIG. 11 illustrates a flowchart for beam forming during a DRX operation of a UE according to an embodiment of the present disclosure.

FIG. 11 illustrates a flowchart for beam forming during a DRX operation of a UE according to an embodiment of the present disclosure.

Figure 12:
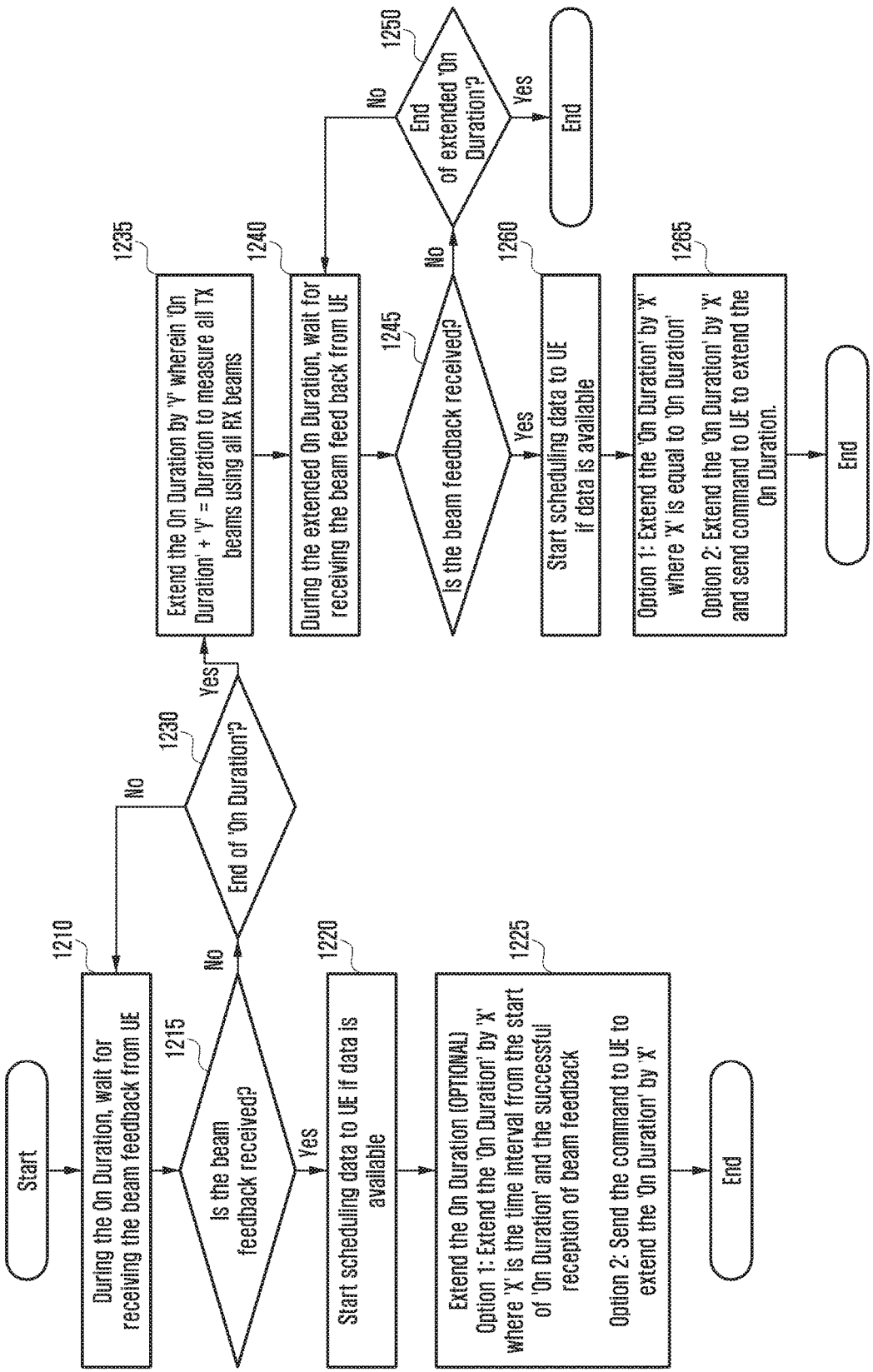
FIG. 12 illustrates a flowchart for beam forming during a DRX operation of a BS according to an embodiment of the present disclosure.

FIG. 12 illustrates a flowchart for beam forming during a DRX operation of a BS according to an embodiment of the present disclosure.

In another embodiment, length of 'On Duration' configured by network can be smaller than time required by the UE to receive the RS/SS for beam measurement using all TX beams and RX beams and time to send the beam feedback to the BS. In this case, it is possible that by the end of 'On duration' the UE may not have detected any TX beam amongst all measurement done so far, whose RSRP/RSRQ/CQI/SINR/SNR is greater than a Threshold (or RSRP/RSRQ/CQI/SINR/SNR>=Threshold). The UE operation in this scenario is illustrated in FIG. 9, FIG. 10, FIG. 11, and FIG. 12.

Referring to FIGS. 9 and 10, the UE operation during the 'On Duration' 910, 1010 is illustrated in FIG. 9 and FIG. 10. A DRX cycle 930, 1030 consists of an 'On Duration' 910, 1010 and a 'DRX Period' 920, 1020. At the start of 'On Duration' 910, 1010 UE start beam measurement (i.e., measuring the beam formed RS transmitted by the BS) (at operation 960, at operation 1060). Alternately, UE may start measurement before the start of 'On Duration' 910, 1010. If the UE has reached the end of 'On Duration' 910, 1010 configured by the network (e.g., the BS) and have not detected any TX beam amongst all measurement done so far whose RSRP/RSRQ/CQI/SINR/SNR is greater than a Threshold (or RSRP/RSRQ/CQI/SINR/SNR>=Threshold) and length of 'On Duration' 910, 1010 is smaller than time required by the UE to receive the RS/SS for beam measurement using all TX beams and RX beams (i.e., the UE has not finished measurement of all TX beams using all RX beams), then the UE perform the following operation:

The UE extends the 'On Duration' 910, 950, 955, 1010, 1050 until the UE completes measurement of all TX beams using all RX beams or until the UE finds one/multiple/network configured number of TX beam(s) whose RSRP/RSRQ/CQI/SINR/SNR is greater than a threshold (or RSRP/RSRQ/CQI/SINR/SNR>=Threshold) and sends beam feedback to the BS, whichever is earlier (at operation 961, at operation 1061).

Referring to FIG. 9, if the UE completes or has not completed measurement of all TX beams using all RX beams, and the UE has found one/multiple/network configured number of TX beam(s) whose RSRP/RSRQ/CQI/SINR/SNR is greater than a threshold (or RSRP/RSRQ/CQI/SINR/SNR>=Threshold) in the extended 'On Duration' (first on duration extension) 950, then the UE sends the beam feedback to the BS (at operation 963). The UE further, extends the 'On Duration' (second on duration extension) 955 by length of 'On Duration' 910 after sending the beam feedback. In addition, at operation 965 the UE starts checking for scheduling message on downlink after the beam feedback is completed. In one embodiment, the extension of 'On Duration' 910 is implicit, as the UE does not transmit any signal explicitly. In this case, the network may also extend the 'On Duration' 910 of the UE implicitly using that there is no received message until the 'On Duration' 910 expires, if there is mandatory message to be received from the UE within every 'On Duration' 910, such as beam feedback. In another embodiment, instead of the UE implicitly extending the 'On Duration' 950, 955, the BS may signal the UE whether to extend 'On Duration' 950, 955 or not. The amount of extension 950, 955 can be length of 'On Duration' 910 or any value signaled by network.

Referring to FIG. 10, if the UE completes measurement of all TX beams using all RX beams, and the UE still has not found TX beam whose RSRP/RSRQ/CQI/SINR/SNR is greater than a Threshold (or RSRP/RSRQ/CQI/SINR/SNR>=Threshold) in the extended 'On Duration' 1050, then the UE enter DRX period in remaining part of DRX cycle (at operation 1063).

In an alternate embodiment, if the UE has reached the end of 'On Duration' 910, 1010 configured by the network, and have detected a TX beam amongst all measurement done so far whose RSRP/RSRQ/CQI/SINR/SNR is greater than a threshold (or RSRP/RSRQ/CQI/SINR/SNR>=Threshold) but the UE has not sent beam feedback to the BS, then the UE extends the 'On Duration' 950, 955, 1050 to send the beam feedback implicitly. After successfully sending the beam feedback, the UE further, extends the 'On Duration' by length of 'On Duration' 910, 1010. In another embodiment, instead of the UE implicitly extending the 'On Duration', the BS may signal the UE whether to extend 'On Duration' 950, 955, 1050 or not. The amount of extension can be length of 'On Duration' 910, 1010 or any value signaled by network.

In an alternate embodiment, in order the UE to extend ON duration 950, 955, 1050, the network may signal an indication (i.e., one-bit to allow such ON duration extension, or fixed/maximum/minimum/mean duration of 'X' for the UE to extend ON duration in terms of time/number of subframes/number of slots/number of symbols/number of HARQ durations, or information to deduce the possible extended ON duration as 'X' in terms of the number of BS beams, the periodicity of RSs for such BS beams, the number of beams transmitted in a period, . . . ) whether the UE is allowed to extend the 'On Duration' or not.

The UE operation in this embodiment of the disclosure is illustrated in FIG. 11.

Referring to FIG. 11, at operation 1110, the UE measures the RSRP/RSRQ/CQI/SINR/SNR of RS transmitted by each TX beam of BS using its each RX beam.

After receiving RS corresponding to a TX beam of the BS using an RX beam and measuring the RSRP/RSRQ/CQI/SINR/SNR of received RS, at operation 1120, the UE checks whether RSRP/RSRQ/CQI/SINR/SNR is greater than a 'threshold' (or RSRP/RSRQ/CQI/SINR/SNR>='threshold'). The 'threshold' may be pre-defined or signaled by network (e.g., the BS) in broadcast signaling or signaled to the UE in dedicated signaling. The 'threshold' may be signaled as part of DRX configuration.

In addition, if the RSRP/RSRQ/CQI/SINR/SNR is not greater than a 'threshold', at operation 1130, the UE determines whether the measurement is completed for each TX/RX beam pair.

If the measurement is completed for each TX/RX beam pair, at operation 1135, the UE determines that the UE is out of coverage area of a serving cell. Then the UE may perform recovery process (for example, cell search, cell reselection, and the like). In addition, if the measurement is not completed for each TX/RX beam pair, at operation 1140, the UE determines whether the 'On duration' is ended.

In addition, if the on duration is not ended, at operation 1147, the UE measures the RSRP/RSRQ/CQI/SINR/SNR for the next TX/RX beam pair, and go to the operation 1120. However, if the on duration is ended, at operation 1145, the UE extends the 'On duration' for measurement. And the UE does not sleep and keep monitoring. Then, at operation 1147, the UE measures the RSRP/RSRQ/CQI/SINR/SNR for the next TX/RX beam pair.

If the beam feedback condition is met, e.g., a measured beam RSRP/RSRQ/CQI/SINR/SNR is greater than a 'threshold', then, at operation 1150, the UE sends beam feedback to the BS. In one embodiment, the beam feedback can be sent using random access (dedicated or contention based) or using dedicated radio resources configured for beam feedback, or using the dedicated SR followed by beam feedback, or any subframe which the BS receives signals by sweeping BS's RX beams while the UE can transmit preamble without the BS's scheduling, or any available subframe which is scheduled by the BS to transmit beam feedback.

After sending the beam feedback successfully (or after receiving the beam switching indication or N subframes after receiving the beam switching indication or from subframe indicated in beam switching indication or N subframes after sending beam feedback successfully, or after the UE changes beam), at operation 1160, the UE starts monitoring the downlink and check for scheduling messages. If the BS has data to transmit, the BS will start transmitting data to the UE after receiving the beam feedback (or after transmitting the beam switching indication or N subframes after transmitting the beam switching indication or from subframe indicated in beam switching indication or N subframes after receiving beam feedback successfully, or after the BS changes beam).

Then, at operation 1170, the UE determines whether the 'On Duration' is already extended for measurement.

If the 'On Duration' is already extended for measurement, at operation 1180, in one embodiment, the UE extends the 'On Duration' by 'x', wherein 'x' is the time equal to 'On Duration'. In another embodiment, instead of the UE implicitly extending the 'On Duration', the BS after receiving the beam feedback may signal the UE whether to extend 'On Duration' or not. The amount of extension can be 'x' or any value signaled by network (e.g., the BS).

If the 'On Duration' is not already extended for measurement, at operation 1190, in one embodiment, the UE extends the 'On Duration' by 'x', wherein 'x' is the time interval from start of 'On Duration' and the successful transmission of the beam feedback. For example, the 'x' is the time consumed by UE in beam measurement and sending the beam feedback. In another embodiment, instead of the UE implicitly extending the 'On Duration', the BS after receiving the beam feedback may signal the UE whether to extend 'On Duration' or not. The amount of extension can be 'x' or any value signaled by network (e.g., the BS).

The BS operation in this embodiment of the disclosure is illustrated in FIG. 12.

Referring to FIG. 12, at operation 1210, the BS waits for receiving the beam feedback from the UE during the on duration. In addition, at operation 1215, the BS determines whether the beam feedback is received from the UE.

If the beam feedback is received from the UE (or the beam switching indication is transmitted to the UE), at operation 1220, the BS starts scheduling data to the UE if data is available. At operation 1225, the BS may extend the 'On Duration' by 'x', wherein 'x' is the time interval from start of 'On Duration' and the successful transmission of the beam feedback. For example, the 'x' is the time consumed by UE in beam measurement and sending the beam feedback. In another embodiment, the BS after receiving the beam feedback may signal the UE whether to extend 'On Duration' or not. The amount of extension can be 'x' or any value signaled by the BS.

In another embodiment, the BS may extend the 'On Duration' by 'x', wherein 'x' is the time consumed by the UE in beam measurement and sending the beam feedback (and possibly corresponding beam switch indication reception) and CQI. In another embodiment, the BS after receiving the beam feedback and CQI may signal the UE whether to extend 'On Duration' or not. The amount of extension can be 'x' or any value signaled by BS.

The operation 1225 is optional operation.

In addition, if the beam feedback is not received from the UE, at operation 1220, the BS determines whether the on duration is ended at operation 1230.

If the on duration is not ended, the BS goes to operation 1210, and waits for receiving the beam feedback from the UE.

However, if is determined, at operation 1230, that the on duration is ended, at operation 1235, the BS extends the 'On Duration' by 'y', wherein 'On Duration'+'y' is the duration to measure all TX beams using all RX beams by the UE. Then, at operation 1240, the BS wait for receiving the beam feedback from the UE during the extended on duration.

At operation 1245, the BS determines whether the beam feedback is received. In addition, if the beam feedback is not received, at operation 1250, the BS determines whether the extended on duration is ended.

If the extended on duration is ended, the operation is end. However, if the extended on duration is not ended, the BS goes to operation 1240.

If the BS receives the beam feedback from the UE, at operation 1260, the BS starts scheduling data to the UE if data is available.

Then, at operation 1265, the BS may extend the 'On Duration' by 'x', wherein 'x' is the time equal to 'On Duration'. In another embodiment, the BS after receiving the beam feedback may signal the UE whether to extend 'On Duration' or not. The amount of extension can be 'x' or any value signaled by the BS.

Figure 13:
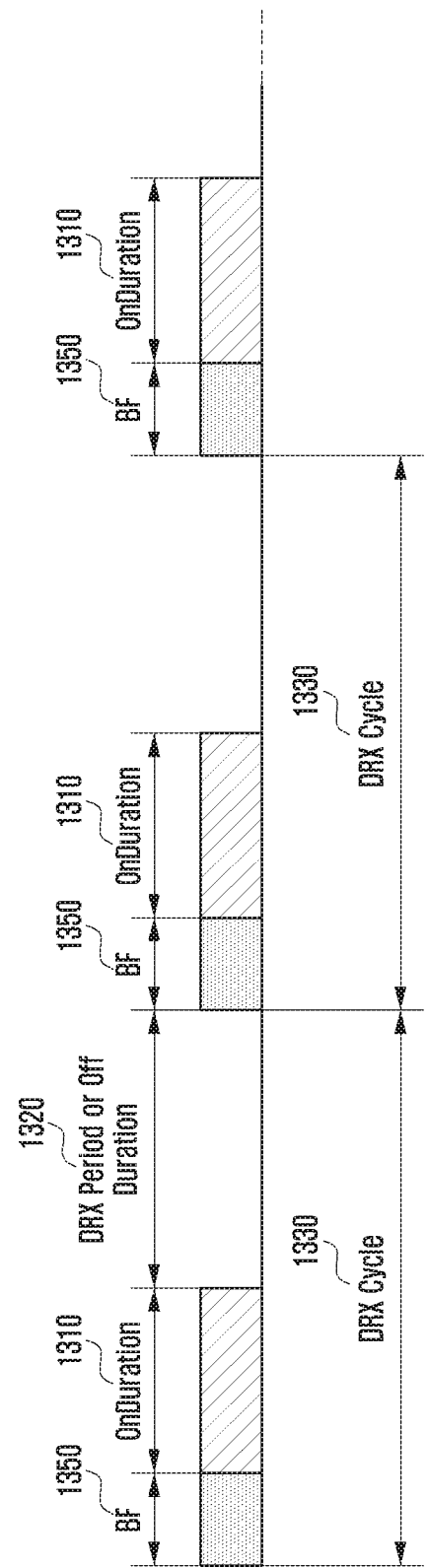
FIG. 13 illustrates a DRX cycle according to an embodiment of the present disclosure.

Method 2:

FIG. 13 illustrates a DRX cycle according to an embodiment of the present disclosure.

Referring to FIG. 13, in a beam formed wireless communication system, a UE in RRC connected state may be configured with a DRX cycle 1330 as shown in FIG. 13. A DRX cycle 1330 consists of an 'On Duration' 1310, 'Beam Feedback Duration' (BF) 1350 and a 'DRX Period' 1320. The length of DRX cycle 1330, length of 'On Duration' 1310, length of 'Beam Feedback Duration' 1350 and start of DRX Cycle 1330 is configured to the UE by the network (e.g., the BS) in signaling message. During the DRX period 1320, the UE can skip reception of downlink channels for battery saving purposes.

The UE start beam measurement (i.e., measuring the beam formed RS, beam formed CSI-RS, or SS transmitted by the BS) at least 'X' duration before the start of beam feedback duration 1350. The UE can determine the duration 'X' based on number of TX beams at the BS, number of RX beams at the UE, timer interval over which TX beams are transmitted by the BS. For example, if the BS has 28 TX beams and it transmits 7 TX beams every 5 ms and the UE has 4 RX beams, then the UE needs to wake up at least (28/7)*5*4=80 ms before the start of beam feedback duration 1350. In alternate embodiment, the UE may also use its velocity to determine number of RX beams and TX beams to use for beam measurement and accordingly determine value of X. For example if the UE is stationary, the UE may just measure the last best TX beam using the last best RX beam or may measure all TX beams using the last best RX beam. If the duration 'X' is larger than time duration between the end of On Duration and start of next On Duration, the UE may not sleep after the end of On Duration. The UE may also notify the network in this case, so that the UE can be scheduled even during the DRX period if the BS has data for the UE.

The UE then sends beam feedback during the beam feedback duration 1350 using the configured dedicated or common resources. After sending the beam feedback successfully (or after receiving the beam switching indication or N subframes after receiving the beam switching indication or from subframe indicated in beam switching indication or N subframes after sending beam feedback successfully, or after the UE changes beam), the UE monitors the downlink and check for scheduling messages (i.e., (E) PDCCH). If the BS has data to transmit it will start transmitting data to the UE after receiving the beam feedback (or after transmitting the beam switching indication or N subframes after transmitting the beam switching indication or from subframe indicated in beam switching indication or N subframes after receiving beam feedback successfully, or after the BS changes beam).

If there is no beam change required (i.e., if the measurement quality of the last reported TX beam>=Threshold or if the measurement quality of the best/all the other beams<=the measured quality of the last reported TX beam+offset), the UE monitors downlink and check for scheduling messages from start of ON duration 1310 using the last (e.g., in previous DRX cycle) reported TX beam and corresponding RX beam.

In an alternate embodiment of the disclosure, until the UE sends beam feedback using the configured dedicated or common resources, the UE can start monitoring the downlink and check for scheduling messages using the last (i.e., in previous DRX cycle) reported TX beam and corresponding RX beam. So the UE monitors downlink and check for scheduling messages from start of BF duration 1350. If the BS has data to transmit it may start transmitting data to the UE using the last (i.e., in previous DRX cycle) reported TX beam before receiving the beam feedback.

In an alternate embodiment, in order the UE to know that there will be BF duration 1350 in front/in the middle of/at the end of ON duration 1310, the network may signal an indication message (i.e., one-bit to notify the existence of BF duration in front of ON duration, or fixed/maximum/minimum/mean duration of 'X' of such BF duration in front of ON duration in terms of time/number of sub-frames/number of slots/number of symbols/number of HARQ durations, or information to deduce such BF duration in front of ON duration as 'X' in terms of the number of BS beams, the periodicity of RSs for such BS beams, the number of beams transmitted in a period, or the location of BF duration within the ON duration consisting of the duration and starting time of the BF in terms of the time/number of sub-frames/number of slots . . . ).

Figure 14:
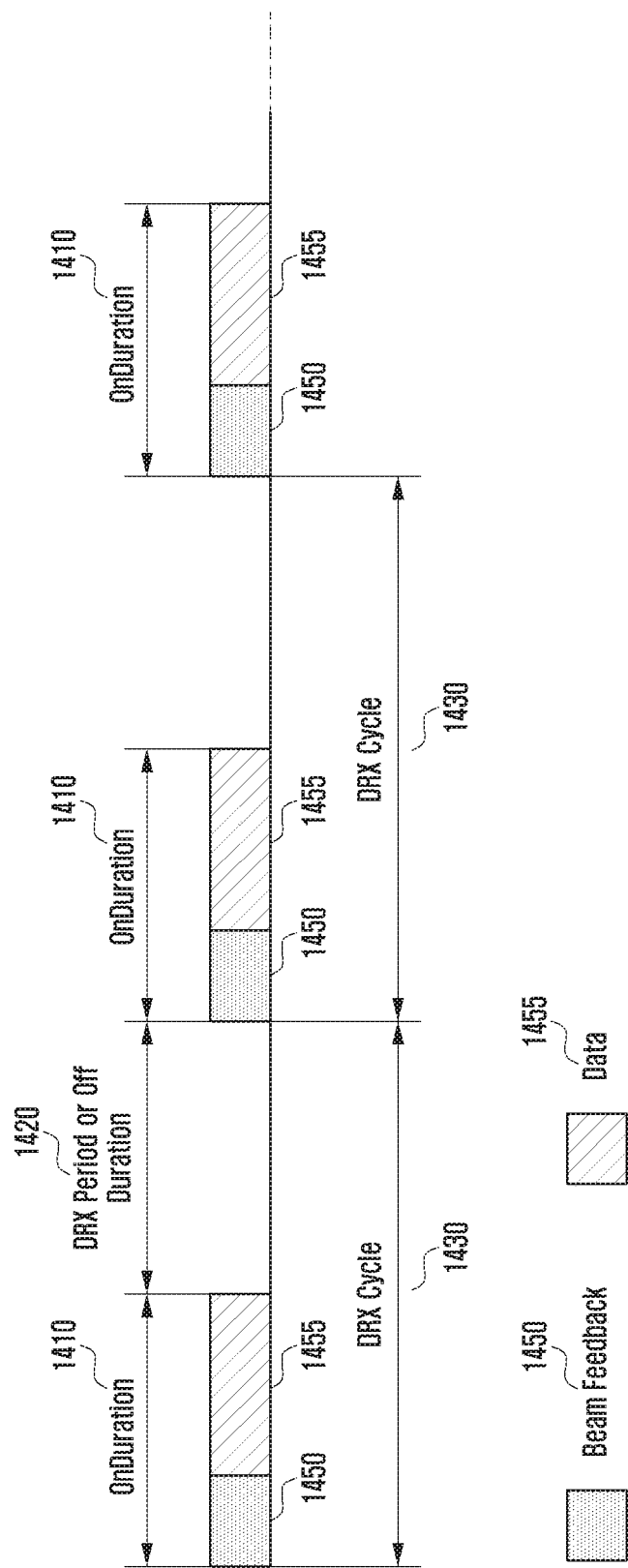
FIG. 14 illustrates a DRX cycle according to an embodiment of the present disclosure.

Method 3:

FIG. 14 illustrates a DRX cycle according to an embodiment of the present disclosure.

Referring to FIG. 14, in a beam formed wireless communication system, a UE in RRC connected state may be configured with a DRX cycle 1430 as shown in FIG. 14. A DRX cycle 1430 consists of an 'On Duration' 1410, and a 'DRX Period' 1420. And the On Duration 1410 comprises beam feedback region 1450, and data region 1455. The length of DRX cycle 1430, length of On Duration 1410, and start of DRX Cycle 1430 is configured to the UE by the network (e.g., the BS) in signaling message. Beam feedback resources can be configured at start of 'On Duration' 1410 or periodically (or periodically) during the 'On Duration' 1410 and may be signaled to the UE. During the DRX period 1420, the UE can skip reception of downlink channels for battery saving purposes.

The UE start beam measurement (i.e., measuring the beam formed RS, beam formed CSI-RS, or SS transmitted by the BS) 'X' duration before the start of 'On duration' 1410. The UE can determine the duration 'X' based on number of TX beams at the BS, number of RX beams at the UE, timer interval over which TX beams are transmitted by the BS. For example, if the BS has 28 TX beams and it transmits 7 TX beams every 5 ms and the UE has 4 RX beams, then the UE needs to wake up at least (28/7)*5*4=80 ms before the start of beam feedback duration 1450. In alternate embodiment, the UE may also use its speed to determine number of RX beams and TX beams to use for beam measurement and accordingly determine value of X. For example, if the UE is stationary, the UE may just measure the last best TX beam using the last best RX beam or may measure all TX beams using the last best RX beam. If the duration 'X' is larger than time duration between the end of On Duration and start of next On Duration, the UE may not sleep after the end of On Duration. The UE may also notify the network in this case, so that the UE can be scheduled even during the DRX period if BS has data for the UE.

The UE then sends beam feedback using the configured dedicated or common resources. After sending the beam feedback successfully (or after receiving the beam switching indication or N subframes after receiving the beam switching indication or from subframe indicated in beam switching indication or N subframes after sending beam feedback successfully, or after the UE changes beam), the UE start monitoring the downlink and check for scheduling messages (i.e., (E) PDCCH). If the BS has data to transmit it will start transmitting data to the UE after receiving the beam feedback (or after transmitting the beam switching indication or N subframes after transmitting the beam switching indication or from subframe indicated in beam switching indication or N subframes after receiving beam feedback successfully, or after the BS changes beam).

In an alternate embodiment of the disclosure, until the UE sends beam feedback using the configured dedicated or common resources, UE can start monitoring the downlink and check for scheduling messages using the last (i.e., in previous DRX cycle) reported TX beam and corresponding RX beam from the start of ON Duration 1410. If the BS has data to transmit it may start transmitting data to the UE using the last (i.e., in previous DRX cycle) reported TX beam before receiving the beam feedback.

In an alternate embodiment, in order the UE to know that there will be BF duration right after/in between/at the end of the ON duration, network may signal an indication message (i.e., one-bit to notify the existence of BF duration right after ON duration starts, or fixed/maximum/minimum/mean duration of 'X' of such BF duration right after ON duration starts in terms of time/number of sub-frames/number of slots/number of symbols/number of HARQ durations, or information to deduce such BF duration right after ON duration starts as 'X' in terms of the number of BS beams, the periodicity of RSs for such BS beams, the number of beams transmitted in a period, or the location of BF duration within the ON duration consisting of the duration and starting time of the BF in terms of the time/number of sub-frames/number of slots).

Method 4:

In another method of disclosure it is proposed that in a beam formed wireless communication system, a UE in RRC connected state may be configured with a DRX cycle 330 as shown in FIG. 3. A DRX cycle 330 consists of an 'On Duration' 310 and a 'DRX Period' 320 similar to DRX cycle 330 in 4G wireless communication system. The length of DRX cycle 330, length of On Duration 310 and start of DRX Cycle 330 is configured to the UE by the network (e.g., the BS) in signaling message. During the DRX period 320, the UE can skip reception of downlink channels for battery saving purposes.

FIG. 15 illustrates data sent using a TX beam reported during last wake up according to an embodiment of the present disclosure.

Figure 16:
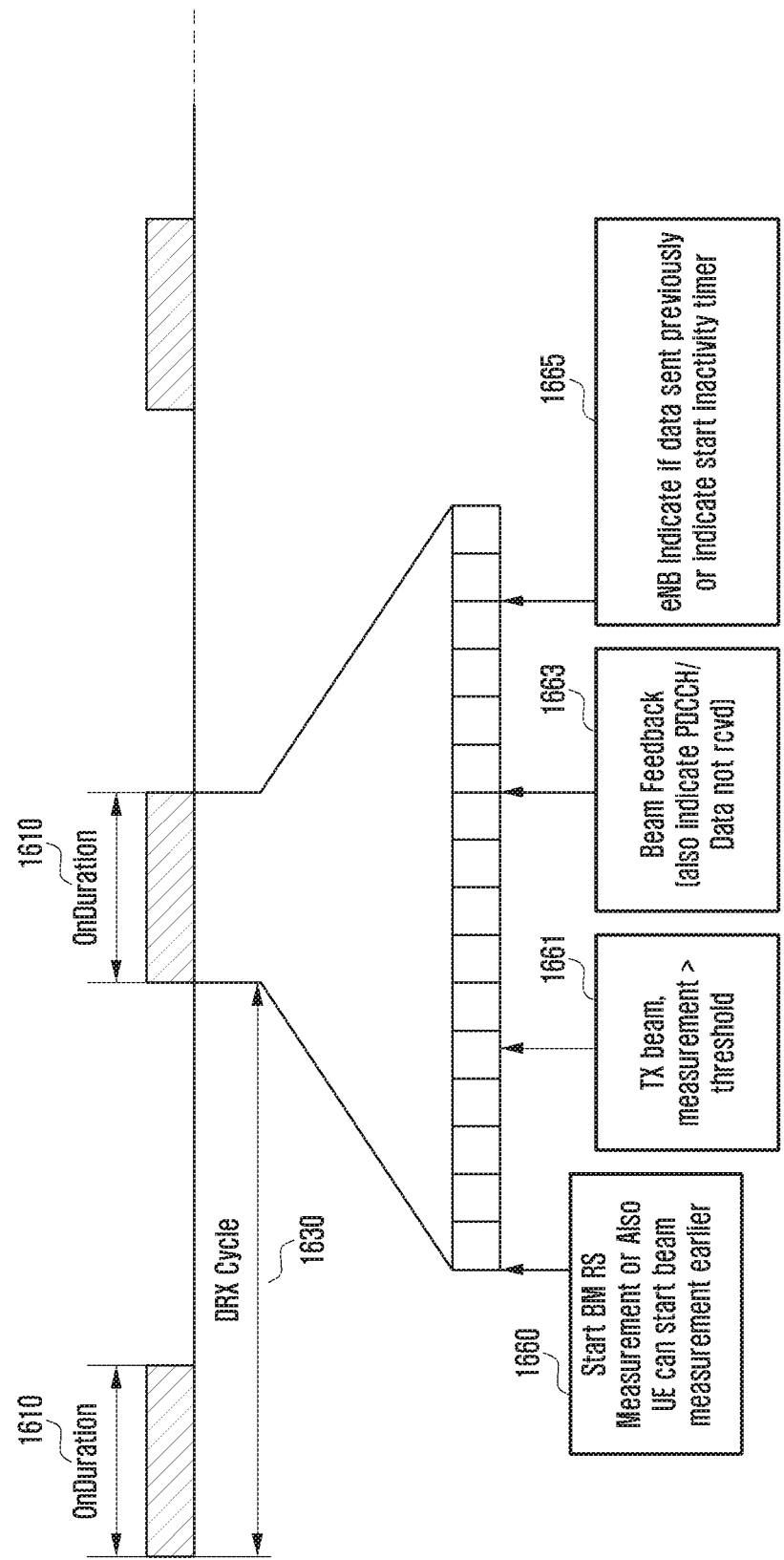
FIG. 16 illustrates a DRX cycle according to an embodiment of the present disclosure.

FIG. 16 illustrates a DRX cycle according to an embodiment of the present disclosure.

Figure 17:
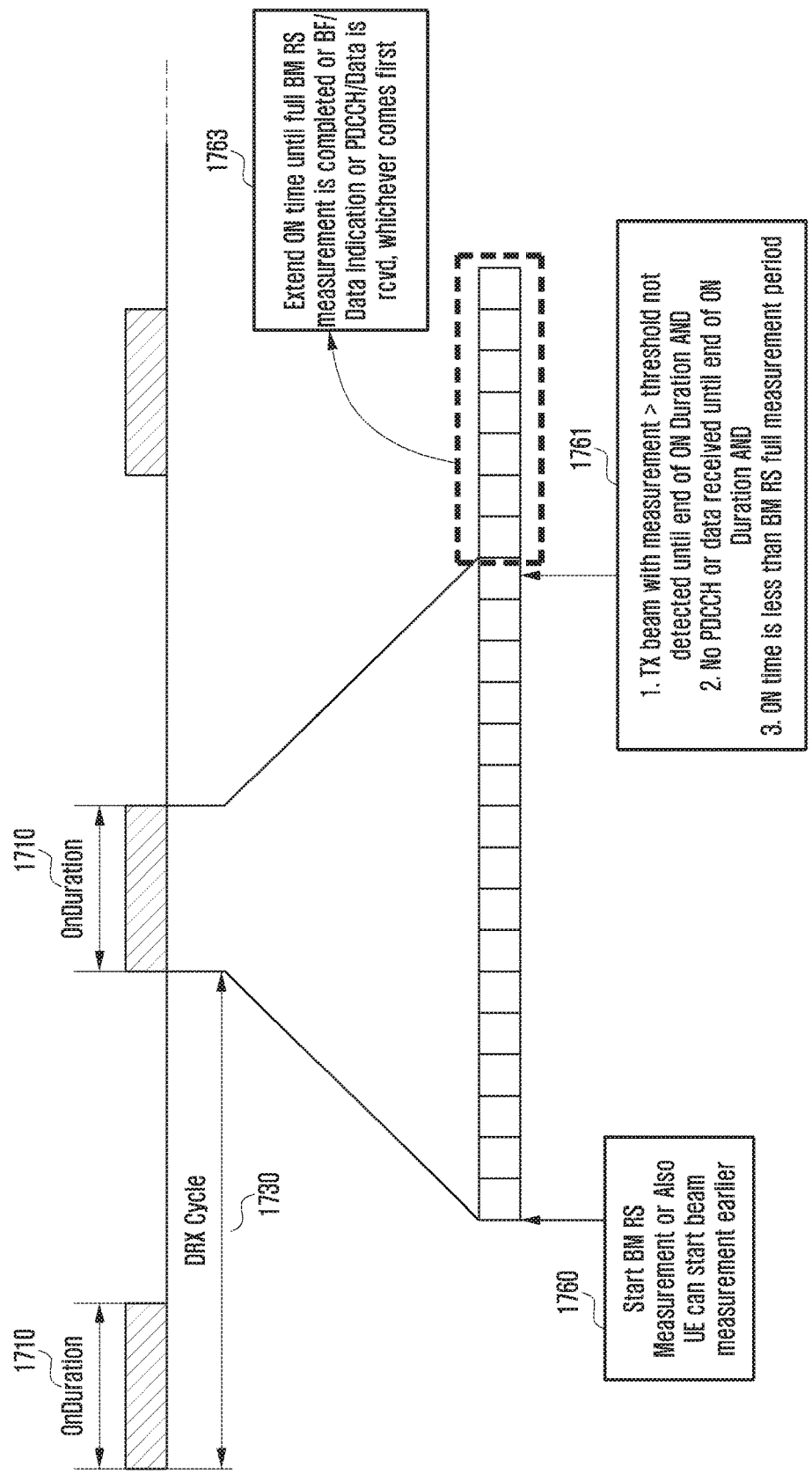
FIG. 17 illustrates a DRX cycle according to an embodiment of the present disclosure.

FIG. 17 illustrates a DRX cycle according to an embodiment of the present disclosure.

Referring to FIG. 15, in this method the UE wakes up and starts monitoring the downlink and check for scheduling messages. The UE uses the best RX beam from previous DRX cycle to receive downlink. The UE will also start beam measurement and send beam feedback to report the best beam. The BS can schedule data (if available) to the UE from the start of ON duration using the last reported best TX beam. If the beam has changed since the last DRX cycle, then the UE cannot distinguish whether the BS has sent any data or not using the last reported best TX beam. If the BS has sent any data then the UE start inactivity timer and if not then the UE does not need to start inactivity timer. If the beam has changed since the last DRX cycle, then method to distinguish whether the BS has sent any data or not using last reported best TX beam is illustrated in FIG. 16 and FIG. 17.

Referring to FIG. 16, at the start of 'On Duration' 1610 the UE starts beam measurement (i.e., measuring the beam formed RS, beam formed CSI-RS, or SS transmitted by the BS) (at operation 1660). Alternately, the UE may start measurement before the start of 'On Duration' 1610 but the beam feedback is sent during the 'On Duration' 1610. The UE measures the RSRP/RSRQ/CQI/SINR/SNR of RS transmitted by each TX beam of the BS corresponding to its each RX beam. The UE may start receiving the RS transmitted by each TX beam using best RX beam of the previous DRX cycle 1630, and then receive the RS transmitted by each TX beam using other RX beams sequentially. Alternately, the UE may receive the RS transmitted by each TX beam using RX beams in any order.

After receiving the RS corresponding to a TX beam of the BS using an RX beam and measuring the RSRP/RSRQ/CQI/SINR/SNR of the received RS at operation 1660, the UE checks whether RSRP/RSRQ/CQI/SINR/SNR is greater than a 'Threshold' (or RSRP/RSRQ/CQI/SINR/SNR>='Threshold') (at operation 1661). If yes, then the UE perform the following:

The UE sends beam feedback to the BS (at operation 1663). In one embodiment, the beam feedback can be sent using random access (dedicated or contention based) or using dedicated radio resources for beam feedback or using dedicated SR followed by beam feedback, or any subframe which the BS receives signals by sweeping BS's RX beams while the UE can transmit preamble without BS's scheduling, or any available subframe which is scheduled by BS to transmit beam feedback. The dedicated resources for the beam feedback may be periodically configured during the 'On Duration' 1610 and signaled to the UE. If the UE has not received any scheduling control (e.g., PDCCH) and/or data, then the UE indicates the same to the BS in beam feedback. The beam feedback may also include the information (e.g., beam id, RSRP/RSRQ/CQI/SINR/SNR, CQI, and the like) about best DL TX beam detected so far.

On receiving the beam feedback with indication that the UE has not received any scheduling control and/or data, and if the BS has sent any scheduling control and/or data to the UE, then the BS indicates the same to the UE (at operation 1665). The UE start inactivity timer on receiving this indication.

Referring to FIG. 17, at the start of 'On Duration' 1610 the UE starts beam measurement (i.e., measuring the beam formed RS transmitted by the BS) (at operation 1760). In another embodiment, length of 'On Duration' 1710 configured by the network can be smaller than time required by the UE to receive the RS for beam measurement using all TX beams and RX beams of the previous DRX cycle 1730, and time required by the UE to send the beam feedback. In this case it is possible that by the end of 'On duration' 1710 the UE may not have detected any TX beam amongst all measurement done so far whose RSRP/RSRQ/CQI/SINR/SNR is greater than a Threshold (or RSRP/RSRQ/CQI/SINR/SNR>=Threshold).

If the UE has reached the end of 'On Duration' 1710 configured by the network, and have not detected any TX beam amongst all measurement done so far whose RSRP/RSRQ/CQI/SINR/SNR is greater than a Threshold (or RSRP/RSRQ/CQI/SINR/SNR>=Threshold) and length of 'On Duration' 1710 is smaller than time required by the UE to receive the RS for beam measurement using all TX beams and RX beams (i.e., UE has not finished measurement of all TX beams using all RX beams) and the UE has not received any scheduling control and/or data until end of On Duration 1710 (at operation 1761), then the UE perform the following operation:

The UE extends the 'On Duration' until the UE completes measurement of all TX beams using all RX beams or UE receives scheduling control and/or data or the UE finds one/multiple/network configured number of TX beam(s) whose RSRP/RSRQ/CQI/SINR/SNR is greater than a threshold (or RSRP/RSRQ/CQI/SINR/SNR>=Threshold) and sends the beam feedback indicating that scheduling control and/or data is not received to the BS, whichever is earlier (at operation 1763).

Figure 18:
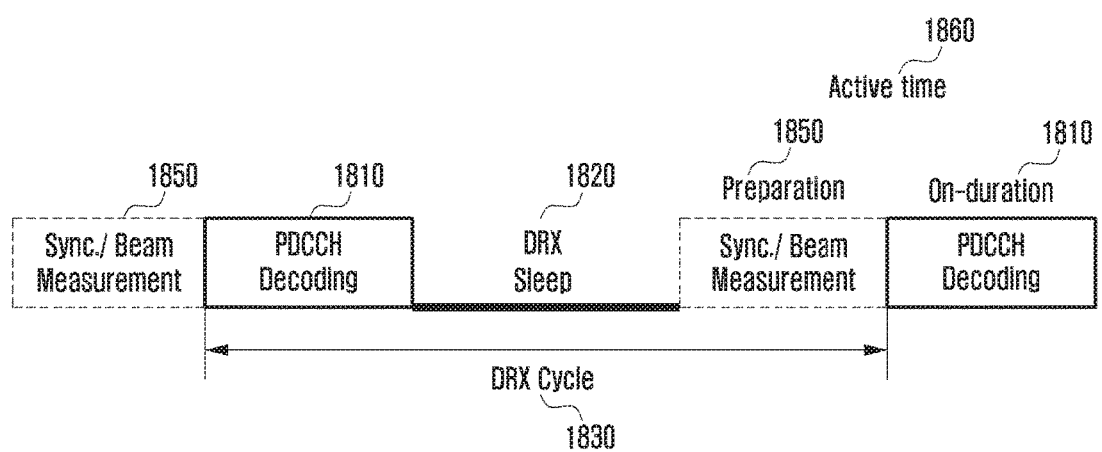
FIG. 18 illustrates a DRX operation according to an embodiment of the present disclosure.

Method 5:

FIG. 18 illustrates a DRX operation according to an embodiment of the present disclosure.

Referring to FIG. 18, active time 1860 is defined as a time duration of which the UE can transmit or receives with a turned-on modem.

DRX cycle 1830 operates with a period which the BS decides, and each DRX cycle 1830 starts at the starting point of an on duration 1810, to the next starting point of an on-duration 1810.

Beam measurement can be independently operated/configured with on duration 1810. The beam measurement duration 1850 can be allocated separately with the on duration 1810, as shown in FIG. 18, or partially/fully overlapped with any on duration 1810. DRX sleep period 1820 may be allocated between the on duration 1810 and the beam measurement duration 1850.

A UE operates with DRX shall measure beams to find any suitable beam, in the analog beamforming based system. This beam measurement duration 1850 should take place right before, or in front of the on duration 1810.

A UE which wakes up periodically, shall transmit at least one beam feedback, which consists of best beam ID and beam channel quality information, for each DRX cycle.

The BS Operation:
Periodic allocation of UL feedback resources for each UE, within the on duration 1810 of the UE.
The resource allocation maybe persistent, semi-persistent, or instantaneous using downlink scheduling control channel (xPDCCH)
The UL Feedback and DL Data can be scheduled independently.
All the resources should be scheduled using the known best beam of each UE
UE Operation:
[Preparation]
Do beam measurement before data transmission/reception
May transmit beam measurement report on PRACH
[Beam Feedback]
If (the best beam is changed && (the OldBeam quality<S)), transmit beam measurement report on PRACH Else transmit beam measurement report using a scheduled resource
[PDCCH Rx]
If (Successfully Received PDCCH for DL Data),
   then reset the DRX inactivity timer to 0 and transit to fully connected mode
Else, go to DRX sleep duration
[Release 5G]
If (RRC inactivity timer expires),
   then
      1. Release 5G connection
      2. And transit to idle mode if not turning off 5G modem, such as stand-alone 5G UE
      3. or turn off the 5G modem if 5G is no more needed, such as LTE dual connectivity supported 5G UE.

If a UE receives any PDCCH message (example: UL beam feedback grant or ACKnowledge of the beam feedback), following the old (release 13) 3GPP LTE standard, the UE will reset the DRX inactivity timer and operates with the fully connected mode. Hence, if the UE receives any PDCCH for the periodic uplink feedback transmission, the UE will keep reset the DRX inactivity timer for each uplink feedback transmission. Therefore, we propose that each UE will not reset their timer, when they receive a message which is categorized as a control message.

If a PDCCH, which is not scheduling actual data transmission or categorized as a control message, is received:
   drx-InactivityTimer shall not be started.
   examples of PDCCH which is not scheduling data transmission are;
      an uplink control information, or beam feedback, or any other uplink transmission request, or
      an UL grant for uplink control information, or beam feedback, or any other uplink transmission request, or
      any acknowledgement or
      any other PDCCH not scheduling resource for actual data transmission During an on duration 1810, for a PDCCH-subframe for a BS capable of transmit PDCCH for scheduling DL data, if any uplink beam feedback, or uplink control information, or beam information is not received, the BS may delay the PDCCH transmission until a UCI or beam information is received.

During an on duration 1810, for a PDCCH-subframe for a BS capable of transmit PDCCH for scheduling DL data, if any UCI or beam information is not received, the BS may transmit an UL grant for scheduling or requesting UCI.

The BS can delay the downlink transmission for a UE operates on connected DRX, until it receives any uplink beam feedback information from the UE.

Figure 19:
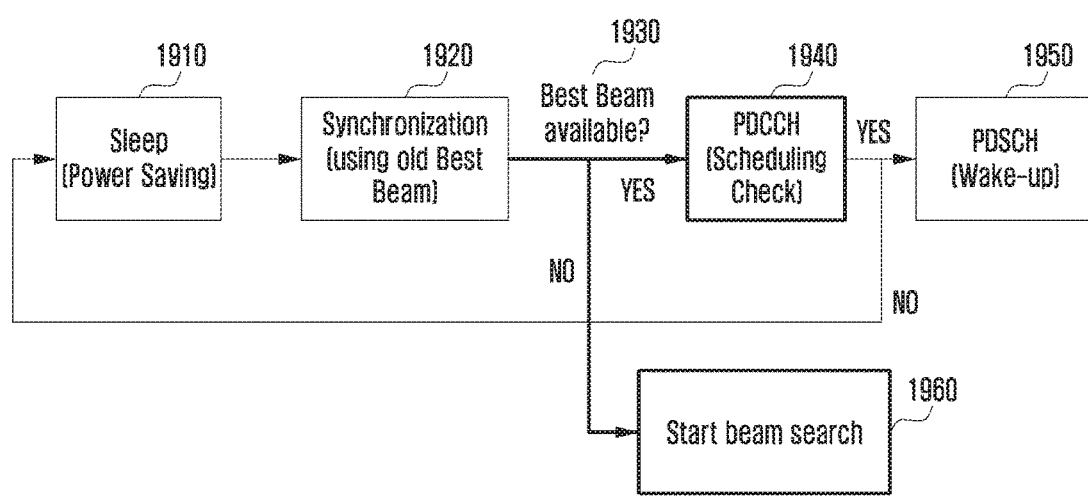
FIG. 19 illustrates a beam measurement method according to an embodiment of the present disclosure.
Figure 20:
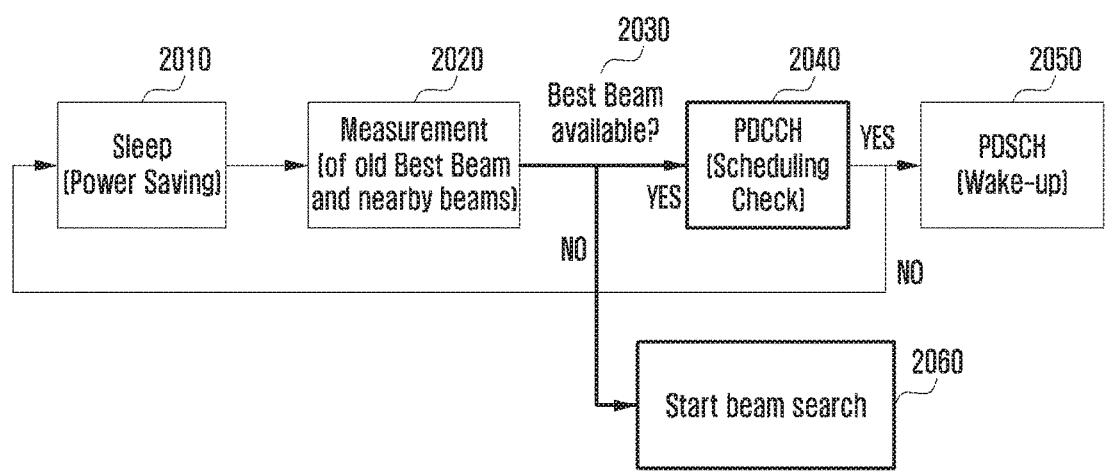
FIG. 20 illustrates a beam measurement method according to an embodiment of the present disclosure.
Figure 21:
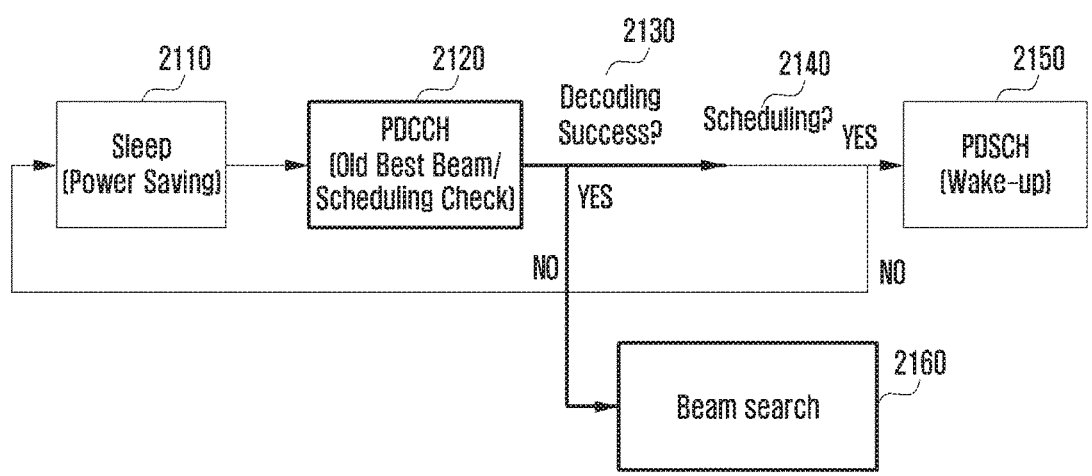
FIG. 21 illustrates a beam measurement method according to an embodiment of the present disclosure.
Figure 22:
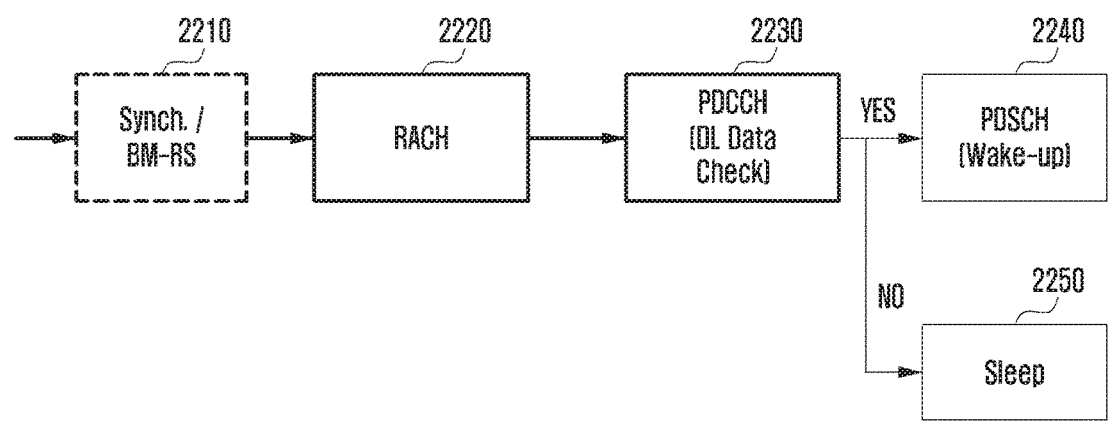
FIG. 22 illustrates a beam measurement method according to an embodiment of the present disclosure.

Purpose: to utilize the recent beam information for downlink data transmission
Transmit downlink data after 'uplink beam feedback+processing time+RX-TX transaction'
Operation based on different UL Feedback scheduling methods
UL feedback scheduling using DL PDCCH within an on duration:
If the UE can receive and decode the DL PDCCH for UL scheduling, the DL channel is suitable for any other data transmission
1) When the best beam is not changed:
UE successfully receives DL PDCCH for UL Feedback,
UE transmits UL beam feedback using the scheduled resource,
and UE receives DL data 2) When the best beam is changed and the old best beam is not available
　If the UE has not transmitted beam feedback:
　　UE fails to receive DL PDCCH for UL Feedback,
　　UE transmits UL beam feedback using other channel, such as xPRACH,
　　and UE receives DL data using the changed best beam
　If the UE has already transmitted beam feedback using other channel, such as xPRACH:
　　BS does not have to schedule another UL feedback using DL PDCCH
　　UE receives DL data using the changed best beam
3) When the best beam is changed and the old best beam is available:
　UE successfully receives DL PDCCH for UL Feedback,
　UE transmits UL beam feedback using the scheduled resource,
　and UE receives DL data using the changed best beam
Persistent/Semi-Persistent allocation:
　If the old best beam is available, the UL beam feedback can be done more efficiently.
When the best beam is changed, the persistent/semi-persistent allocation of UL beam feedback also needs to be done again.
1) When the best beam is not changed:
UE transmits UL beam feedback using the scheduled resource,
and UE receives DL data
2) When the best beam is changed and the old best beam is not available
　If the UE has not transmitted beam feedback:
　　UE cannot use the scheduled UL beam feedback resource
　　UE transmits UL beam feedback using other channel, such as xPRACH,
　　and UE receives DL data using the changed best beam
　If the UE has already transmitted beam feedback using other channel, such as xPRACH:
　　UE does not have to transmit another UL beam feedback
　　UE receives DL data using the changed best beam
3) When the best beam is changed and the old best beam is available:
　UE transmits UL beam feedback using the scheduled resource,
　and UE receives DL data using the changed best beam
The BS can try to transmit downlink data, irrespective of reception of UL beam feedback
　Separate operation of beam feedback and downlink data transmission
　Operation based on different UL Feedback scheduling methods
　　UL feedback scheduling using DL PDCCH within an on duration:
1) When the best beam is not changed:
UE successfully receives DL PDCCH for UL Feedback,
UE transmits UL beam feedback using the scheduled resource,
Separately, UE receives DL data
2) When the best beam is changed and the old best beam is not available
　If the UE has not transmitted beam feedback:
　　UE fails to receive DL PDCCH for UL Feedback,
　　UE transmits UL beam feedback using other channel, such as xPRACH,
　　After the BS changes to the new best beam, UE can receive DL data
　　UE may delay the xPDCCH reception after uplink beam feedback transmission
　If the UE has already transmitted beam feedback using other channel, such as xPRACH:
　　BS does not have to schedule another UL feedback using DL PDCCH
　　UE receives DL data using the changed best beam
3) When the best beam is changed and the old best beam is available:
　UE successfully receives DL PDCCH for UL Feedback,
　UE transmits UL beam feedback using the scheduled resource,
　After the BS changes to the new best beam, UE can receive DL data
　UE may delay the xPDCCH reception after uplink beam feedback transmission
Persistent/Semi-Persistent allocation:
1) When the best beam is not changed:
UE transmits UL beam feedback using the scheduled resource,
Separately, UE receives DL data
2) When the best beam is changed and the old best beam is not available
　If the UE has not transmitted beam feedback:
　　UE cannot use the scheduled UL beam feedback resource
　　UE transmits UL beam feedback using other channel, such as xPRACH,
　　After the BS changes to the new best beam, UE can receive DL data
　　UE may delay the xPDCCH reception after uplink beam feedback transmission
　If the UE has already transmitted beam feedback using other channel, such as xPRACH:
　　UE does not have to transmit another UL beam feedback
　　UE receives DL data using the changed best beam
3) When the best beam is changed and the old best beam is available:
　UE transmits UL beam feedback using the scheduled resource,
　After the BS changes to the new best beam, UE can receive DL data
　UE may delay the xPDCCH reception after uplink beam feedback transmission Specific Beam Measurement Method FIG. 19 illustrates a beam measurement method according to an embodiment of the present disclosure, FIG. 20 illustrates a beam measurement method according to an embodiment of the present disclosure, FIG. 21 illustrates a beam measurement method according to an embodiment of the present disclosure, and FIG. 22 illustrates a beam measurement method according to an embodiment of the present disclosure.

Referring to FIGS. 19, 20, 21, and 22, the UE measures part of beams (which have expectations of high probability of being the next best beam) first, to reduce the beam search latency.

Using the old best beam information (FIG. 19)
　　Sleep (power saving) (at operation 1910)
　　Synchronization (using old best beam) (at operation 1920)
　　Check the old beam first (at operation 1930)
　　If the previously used beam is available (RSRP/RSRQ/CQI/SNR/SINR>=Threshold), use the beam (at operation 1940). Receive PDCCH (scheduling check)

If the PDCCH is received, receive PDSCH (wake up) (at operation 1950). If the PDCCH is not received, go to sleep mode.

If the previously used beam is not available (RSRP/RSRQ/CQI/SNR/SINR<Threshold), start beam search (at operation 1960)

Using the old best beam information (FIG. 20)

Sleep (power saving) (at operation 2010)

Measure the old beam and its nearby beams (max. N) (at operation 2020)

Check the old beam first (at operation 2030)

If the previously used beam is found and available (RSRP/RSRQ/CQI/SNR/SINR>=Threshold), use the beam (at operation 2040). Receive PDCCH (scheduling check)

If the PDCCH is received, receive PDSCH (wake up) (at operation 2050). If the PDCCH is not received, go to sleep mode.

If the best beam is not found and/or not available, start beam search (at operation 2060)

Do not measure beams first (FIG. 21)

Sleep (power saving) (at operation 2110)

Receive and decode PDCCH directly using the old best beam (2120)

Check decoding is success (at operation 2130).

If decoding is success, check scheduling is available (at operation 2140).

If scheduling is available, receive PDSCH (wake up) (at operation 2150).

If scheduling is not available, go to sleep mode.

If decoding is not success start beam search (at operation 2160)

Beam Search and data check operation (FIG. 22)

Synchronization and BM-RS (at operation 2210)

transmitting beam feedback using a common channel, e.g., RACH (at operation 2220)

Receive PDCCH (DL data check) (at operation 2230)

If the PDCCH is received, receive PDSCH (wake up) (at operation 2240). If the PDCCH is not received, go to sleep mode (at operation 2250).

Figure 23:
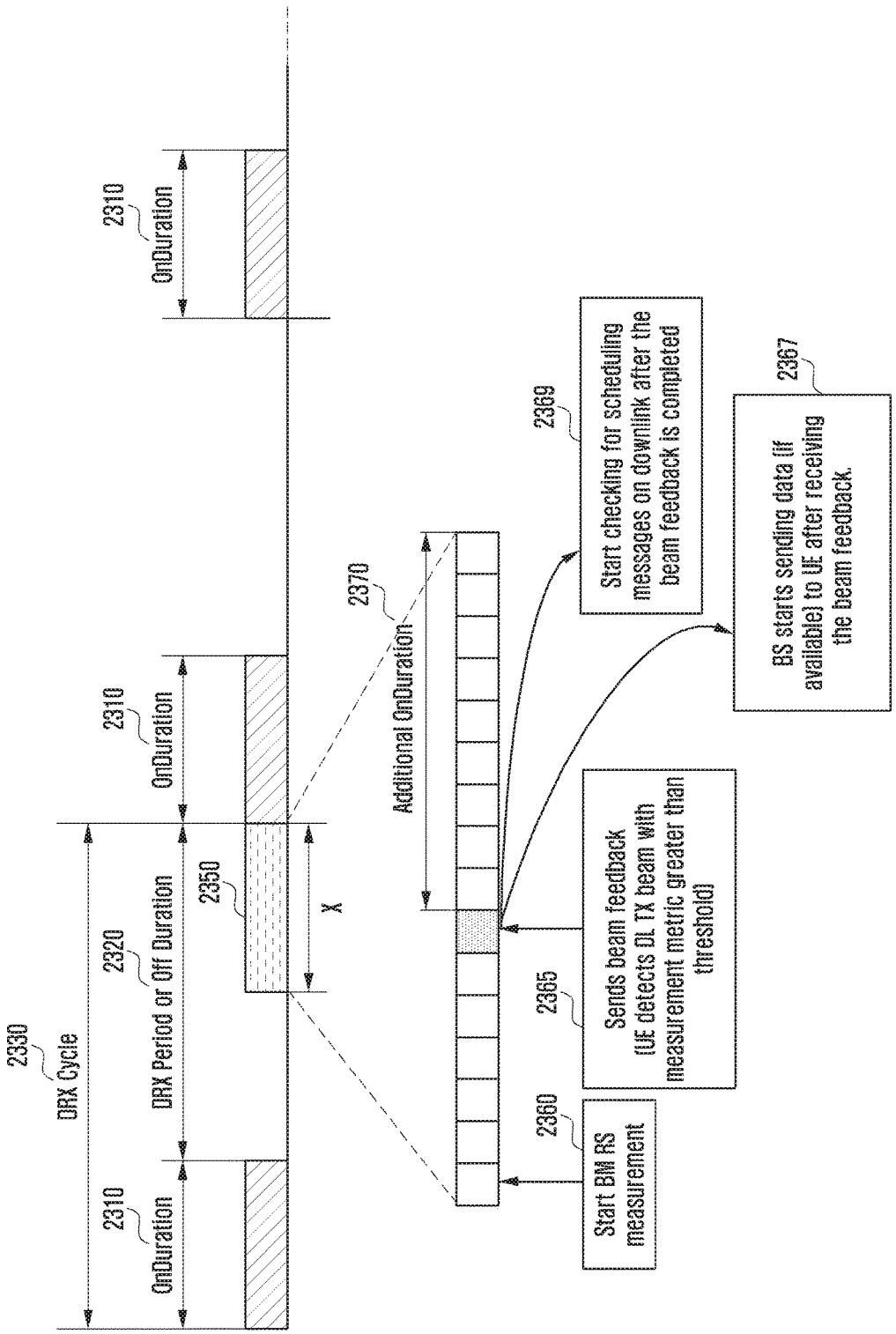
FIG. 23 illustrates a DRX cycle according to an embodiment of the present disclosure.

Method 6:

FIG. 23 illustrates a DRX cycle according to an embodiment of the present disclosure.

Referring to FIG. 23, in a beam formed wireless communication system, a UE in RRC connected state may be configured with a DRX cycle 2330. A DRX cycle 2330 consists of an 'On Duration' 2310, and a 'DRX Period' 2320. The length of DRX cycle 2330, length of 'On Duration' 2310, and start of DRX Cycle 2330 is configured to the UE by the network (e.g., the BS) in signaling message. During the DRX period 2320, the UE can skip reception of downlink channels for battery saving purposes.

The UE start beam measurement (i.e., measuring the beam formed RS, beam formed CSI-RS, or SS transmitted by the BS) at least 'X' duration 2350 before the start of 'On duration' 2310 (at operation 2360). The UE can determine the duration 'X' 2350 based on number of TX beams at the BS, number of RX beams at the UE, timer interval over which TX beams are transmitted by the BS. For example, if the BS has 28 TX beams and it transmits 7 TX beams every 5 ms and the UE has 4 RX beams, then the UE needs to wake up at least (28/7)*5*4=80 ms before the start of 'On Duration' 2310. In alternate embodiment, the UE may also use its velocity to determine number of RX beams and TX beams to use for beam measurement and accordingly determine value of X 2350. For example if the UE is stationary, the UE may just measure the last best TX beam using the last best RX beam or may measure all TX beams using the last best RX beam. In an embodiment, if the duration 'X' is larger than time duration between the end of On Duration and start of next On Duration, the UE may not sleep after the end of On Duration. The UE may also notify the network in this case, so that the UE can be scheduled even during the DRX period if the BS has data for the UE.

The UE determines if there is any TX beam whose RSRP/RSRQ/CQI/SINR/SNR is greater than a Threshold (or RSRP/RSRQ/CQI/SINR/SNR>=Threshold). In addition, if the UE find a TX beam (or finds a TX beam different from last best TX beam reported to BS), then the UE perform the following:

The UE sends beam feedback to the BS (at operation 2365). In one embodiment, the beam feedback can be sent using random access (dedicated or contention based) or using dedicated radio resources configured for beam feedback or using dedicated SR followed by beam feedback, or any subframe which the BS receives signals by sweeping BS's rx beams while the UE can transmit preamble without BS's scheduling, or any available subframe which is scheduled by the BS to transmit beam feedback. The beam feedback may include the information (e.g., beam id, RSRP/RSRQ/CQI/SINR/SNR, and the like) about best DL TX beam detected so far. Note that the UE can send beam feedback even before the start of 'On Duration' 2310 if UE find the best or suitable TX beam. In one embodiment, instead of explicitly sending the beam feedback, the UE may initiate random access and as part of random access procedure the BS will come to know about the best or suitable DL TX beam. For example, the RA preamble or MSG3 may indicate DL TX beam or TX beam can be same as RX beam through which the BS receives the RA preamble.

After sending the beam feedback (or after receiving the beam switching indication or N subframes after receiving the beam switching indication or from subframe indicated in beam switching indication or N subframes after sending beam feedback successfully, or after the UE changes beam), the UE monitors the downlink and check for scheduling messages (i.e., (E) PDCCH) using the updated beam (at operation 2369). The time from which the UE monitors the downlink and check for scheduling messages using the updated beam can be before the start of 'On Duration' 2310. If the BS has data to transmit, the BS will start transmitting data to the UE after receiving the beam feedback (or after sending the beam switching indication to the UE or N subframes after transmitting the beam switching indication or from subframe indicated in beam switching indication or N subframes after receiving the beam feedback successfully or after the BS changes beam) (at operation 2367). Note that this may be even before the start of 'On Duration' 2310. Key point of this method is that start of on duration 2310 is preponed 2370 or the UE starts monitoring DL earlier than start of On Duration 2310.

(Alternate) After sending the beam feedback, if the UE receives beam switching indication including indication that the BS has DL data to transmit or including indication to start monitoring DL, the UE start monitoring the downlink and check for scheduling messages (i.e., (E) PDCCH) after receiving the beam switching indication or N subframes after receiving the beam switching indication or from the subframe indicated in beam switching indication. The time from which the UE monitors the downlink and check for scheduling messages using the updated beam can be before the start of 'On Duration'. If the UE receives the beam switching indication without indication that the BS has DL data to transmit or without indication to start monitoring DL, the UE does not start monitoring the downlink and the UE skips DL monitoring of 'ON Duration' 2310 as well (that is, the UE sleeps (no wake up in additional on duration 2370 and in on duration 2310)). After receiving the beam feedback, if the BS has DL data to transmit, the BS sends beam switching indication with indication that the BS has DL data to transmit or with indication to start monitoring DL to the UE. If the BS does not have DL data to transmit, it sends beam switching indication without indication that the BS has DL data to transmit or without indication to start monitoring DL to the UE.

(Alternate) After sending the beam feedback, if the UE receives beam switching indication including indication that the BS has DL data to transmit or including indication to start monitoring DL before the start of on Duration, the UE start monitoring the downlink and check for scheduling messages after receiving the beam switching indication or N subframes after receiving the beam switching indication or from subframe indicated in beam switching indication. If the UE receives beam switching indication without indication that the BS has DL data to transmit or without indication to start monitoring DL before the start of ON duration, the UE does not start monitoring the downlink before start of ON duration. The UE however starts monitoring DL from start of 'ON Duration' 2310. After receiving the beam feedback, if the BS have DL data to transmit, it sends switching indication with indication that the BS has DL data to transmit or with indication to start monitoring DL to the UE. If the BS does not have DL data to transmit, it sends switching indication without indication that the BS has DL data to transmit or without indication to start monitoring DL to the UE.

(Alternate) After sending the beam feedback, if the UE receives beam switching indication including indication that the BS has DL data to transmit or including indication to start monitoring DL, the UE start monitoring the downlink and check for scheduling messages from the start of ON Duration or after receiving the beam switching indication or N subframes after receiving the beam switching indication or from subframe indicated in beam switching indication, whichever is later. If the UE receives beam switching indication without indication that the BS has DL data to transmit or without indication to start monitoring DL, the UE does not start monitoring the downlink before start of ON duration 2310 and even during the ON Duration 2310 (that is, the UE sleeps).

If there is no beam change required (i.e., if the measurement quality of the last reported TX beam>=Threshold or if the measurement quality of the best/all the other beams<=the measured quality of the last reported TX beam+ offset), and/or time at which beam change is applied is not before the start of ON duration 2310, then ON duration 2310 is not preponed. The UE monitors the downlink and check for scheduling messages using the last reported TX beam and corresponding RX beam from the start of ON duration 2310. If the BS has data to transmit, it may start transmitting data to the UE using the last reported TX beam. If there is beam change and/or or time at which beam change is applied is before the start of ON duration 2310, then ON duration 2310 is preponed as explained above 2370. In one embodiment, if beam is changed during T duration before the start of ON duration 2310 then ON duration 2310 is preponed 2370 i.e., the UE starts monitoring DL from the time that beam change is applied.

In an embodiment if the UE receives data while the UE is monitoring DL for beam switching indication after sending the beam feedback, it continue to remain wakeup in the duration before the start of ON duration 2310.

In an embodiment if the timer interval between receiving the beam switching indication and the start of on duration 2310 is above a threshold, then the UE sleeps and wakeup at the start of ON duration. If the timer interval between receiving the beam switching indication and the start of on duration is below a threshold, then the UE remains wakeup. For example, if the beam switching indication is received in subframe X after sending the beam feedback and On duration 2310 starts in subframe Y, and if Y-X<threshold, the UE remains wakeup. Otherwise it sleeps.

In an embodiment if the timer interval between receiving the beam switching indication and the start of on duration is below a threshold, then the UE sleeps and wakeup at the start of ON duration. If the timer interval between receiving the beam switching indication and the start of on duration is above a threshold then the UE remains wakeup. For example, if the beam switching indication is received in subframe X after sending the beam feedback and On duration starts in subframe Y, and if Y-X>threshold, the UE remains wakeup. Otherwise it sleeps.

In an embodiment if the timer interval between transmitting the beam feedback and the start of on duration is above a threshold, then the UE sleeps and wakeup at start of ON duration. If the timer interval between transmitting the beam feedback and start of on duration is below a threshold, then the UE remains wakeup.

In an embodiment if the timer interval between transmitting the beam feedback and the start of on duration is below a threshold, then the UE sleeps and wakeup at the start of ON duration. If the timer interval between transmitting the beam feedback and start of on duration is above a threshold, then the UE remains wakeup.

Figure 24:
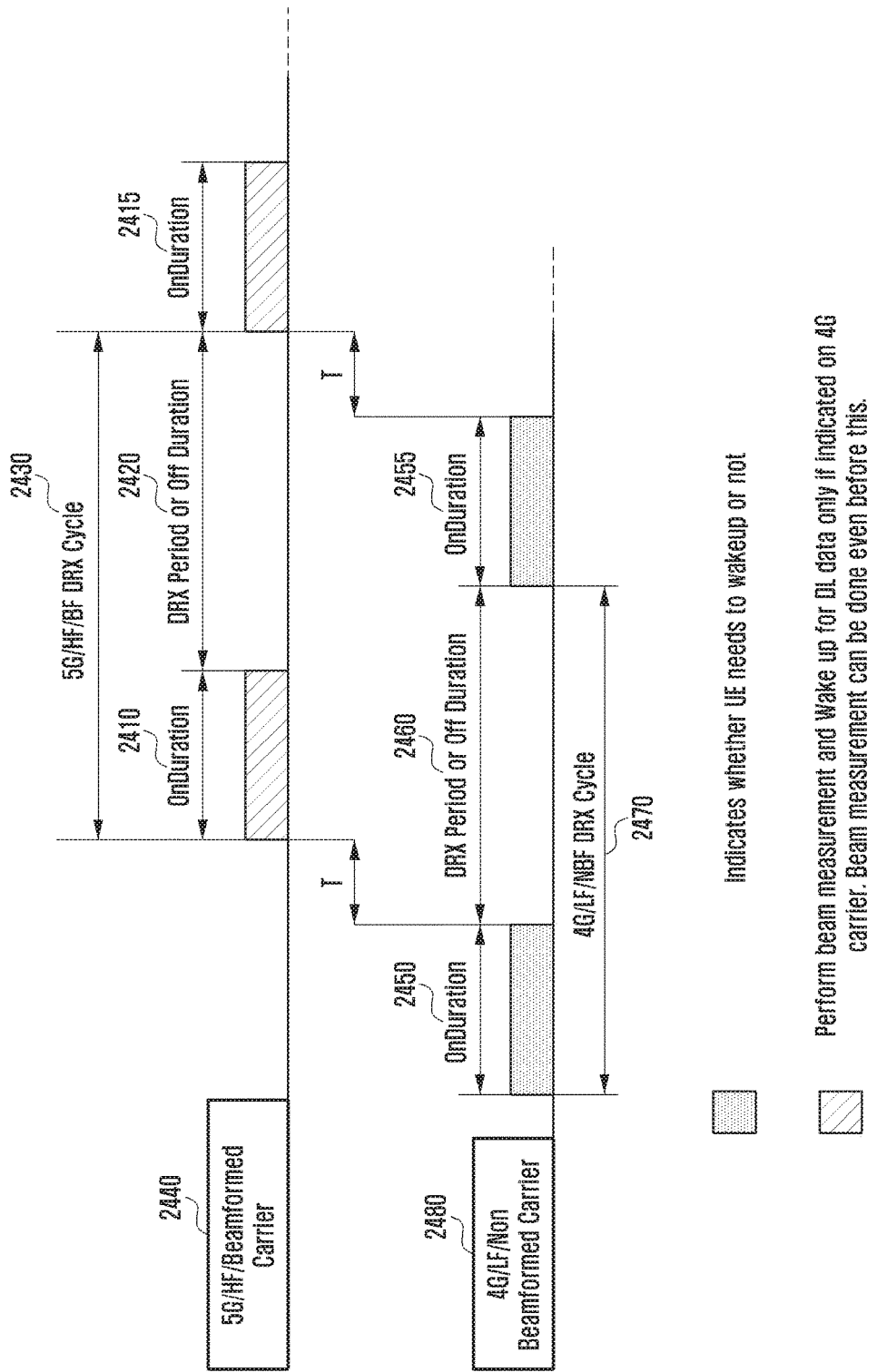
FIG. 24 illustrates a DRX cycle according to an embodiment of the present disclosure.
Figure 25B:
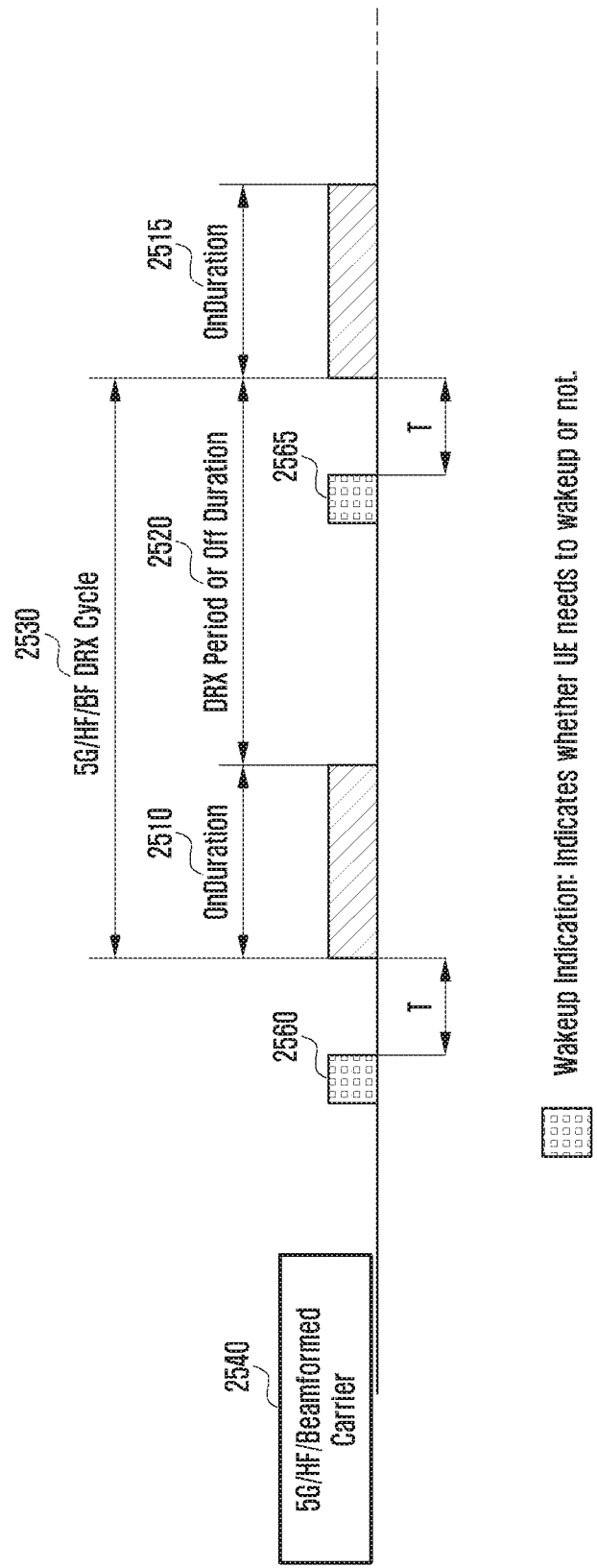
FIG. 25B illustrates a DRX cycle according to an embodiment of the present disclosure.

Method 7:

FIG. 24 illustrates a DRX cycle according to an embodiment of the present disclosure, FIG. 25A illustrates a DRX cycle according to an embodiment of the present disclosure, and FIG. 25B illustrates a DRX cycle according to an embodiment of the present disclosure.

In case of non-standalone system wherein the UE is using both 4G carrier and 5G carrier in connected mode, the UE have to wake up on 5G carrier every DRX cycle for beam measurement and monitoring DL data during On Duration as explained in previous methods and also according to methods in prior art. If there is no data to be scheduled in DL on 5G carrier, DL data monitoring on 5G carrier can be avoided in existing methods wherein the BS can send command on 5G carrier to the UE during 'On Duration' to sleep. However, irrespective of whether there is data to be scheduled in DL or not, the UE still has to perform beam measurement every DRX cycle. The UE wakeup duration can be quite significant for beam measurement.

Referring to FIG. 24 and FIG. 25A, in this method we proposed that an indication can be sent on 4G carrier 2480, 2580 indicating whether DL data will be scheduled on 5G carrier 2440, 2540 or indication can be sent on 4G carrier 2480, 2580 indicating the UE to wake up on 5G carrier 2440, 2540 in upcoming DRX cycle 2430, 2530 or indication can be sent on 4G carrier 2480, 2580 indicating the UE to wake up on 5G carrier 2440, 2540 and perform beam measurement. The DRX cycle 2430 consists of an 'On Duration' 2510, and a 'DRX Period' or 'Off Duration' 2520. If the UE receives indication on 4G carrier 2480, 2580 indicating that DL data will be scheduled on 5G carrier 2440, 2540 or indicating the UE to wake up or indicating the UE to wake up on 5G carrier 2440, 2540 and perform beam measurement, then the UE will perform beam measurement and monitor DL on 5G carrier 2440, 2540. The indication can be sent at an offset T from the start of the 'On Duration' 2410, 2415, 2510, 2515 on 5G carrier 2440, 2540. The offset T can be the time needed to perform full TX/RX beam sweeping for beam measurement. The UE may indicate its RX beam capability to 5G/4G NB for determination of this offset. Alternately, the UE may calculate this offset T and indicate the same to the BS. The UE/BS can determine the duration 'offset' T based on number of TX beams at the BS, number of RX beams at the UE, timer interval over which TX beams are transmitted by the BS. For example, if the BS has 28 TX beams and it transmits 7 TX beams every 5 ms and the UE has 4 RX beams, then offset T is at least (28/7)*5*4=80 ms. In alternate embodiment, the UE/BS may also use the UE speed to determine number of RX beams and TX beams to use for beam measurement and accordingly determine value of offset. For example if the UE is stationary, the UE may just measure the last best TX beam using the last best RX beam or may measure all TX beams using the last best RX beam.

If the DRX is configured for 4G carrier 2480 then DRX cycles of 4G carrier 2480 and 5G carrier 2440 can be configured such that there is an offset (T) between ON Duration of 4G 2450, 2455 and ON Duration of 5G 2410, 2415 as shown in FIG. 24. The offset can be zero in one embodiment. A 4G/LF/NBF DRX cycle 2470 consists of the ON Duration of 4G 2450, and a 'DRX Period' or 'Off Duration' 2460.

If the DRX is not configured for 4G carrier 2580 then wake up indication on 4G carrier 2580 for 5G carrier 2540 can be configured such that there is an offset (T) between wake up indication on 4G 2550, 2555 and 5G ON duration 2510, 2515 as shown in FIGS. 25A and 25B. The offset can be zero in one embodiment, for example in cases wherein the UE starts beam measurements from start of On Duration 2510, 2515.

5G nodes B (5G BS) may signal DL data scheduling indication for an UE to 4G node B (4G BS) over X2 interface. Alternately, 4G node B may decide itself, for example for split bearer from 4G NB, 4G NB decides whether data is sent on 4G carrier or 5G carrier.

In one embodiment, instead of 4G and 5G carrier 2480, 2580, 2440, 2540, the carrier can be low frequency (no need of beamforming) carrier and High frequency (beamforming is needed) carrier.

In one embodiment, 4G/LF/NBF and 5G/HF/BF carrier can be from same BS or different BS.

Wake up indication can be sent using a field in DCI. It can be send using MAC CE or RRC message.

And the wake up indication also referred as beam measurement indication requesting the UE to perform beam measurement.

Referring to FIG. 25B, in an embodiment an indication 2560, 2565 can be sent on same carrier (i.e., 5G carrier 2540) indicating whether the DL data will be scheduled or indication to wake up in upcoming DRX cycle 2530 or indication 2560, 2565 can be sent indicating the UE to wake up and perform beam measurement on same carrier 2540. The DRX cycle 2530 consists of an 'On Duration' 2410, and a 'DRX Period' or 'Off Duration' 2420. The network configures the UE with time and frequency resources for monitoring this indication 2560, 2565. If the UE receives indication 2560, 2565 indicating that DL data will be scheduled or indicating the UE to wake up or indicating the UE to wake up and perform beam measurement, then the UE will perform beam measurement and monitor DL on that carrier. The indication 2560, 2565 can be sent at an offset T from the start of 'On Duration' 2510, 2515 on the carrier 2540. The offset T can be the time needed to perform full TX/RX beam sweeping for beam measurement. The UE may indicate its RX beam capability to 5G/4G NB for determination of this offset T. Alternately, the UE may calculate this offset and indicate the same to the NB. Alternately, the UE may calculate this offset and indicate the same to the NB. The UE/NB can determine the duration 'offset' T based on number of TX beams at the BS, number of RX beams at the UE, timer interval over which TX beams are transmitted by the BS. For example, if the BS has 28 TX beams and it transmits 7 TX beams every 5 ms and the UE has 4 RX beams, then the offset T is at least (28/7)*5*4=80 ms. In alternate embodiment, the UE/NB may also use the UE speed to determine number of RX beams and TX beams to use for beam measurement and accordingly determine value of offset T. For example if the UE is stationary, the UE may just measure the last best TX beam using the last best RX beam or may measure all TX beams using the last best RX beam.

Method 8:

FIG. 26 illustrates a DRX cycle according to an embodiment of the present disclosure.

Referring to FIG. 26, in a beam formed wireless communication system, a UE in RRC connected state may be configured with a DRX cycle 2630. A DRX cycle 2630 consists of an 'On Duration' 2610, and a 'DRX Period' 2620. The length of DRX cycle 2630, length of 'On Duration' 2610, and start of DRX Cycle 2630 is configured to the UE by the network (e.g., the BS) in signaling message. During the DRX period 2620, the UE can skip reception of downlink channels for battery saving purposes.

The UE starts beam measurement (i.e., measuring the beam formed RS, beam formed CSI-RS, or SS transmitted by the BS) 'T' duration 2650 before the start of 'On duration' 2610 (at operation 2660). The duration 'T' 2650 may correspond to an additional 'On Duration' 2670. The UE can determine the duration 'T' 2650 based on number of TX beams at the BS, number of RX beams at the UE, timer interval over which TX beams are transmitted by the BS. For example, if the BS has 28 TX beams and it transmits 7 TX beams every 5 ms and UE has 4 RX beams, then the UE needs to wake up at least (28/7)*5*4=80 ms before the start of 'On Duration' 2610. In alternate embodiment, the UE may also use its velocity to determine number of RX beams and TX beams to use for beam measurement and accordingly determine value of 'T' 2650. For example if the UE is stationary, the UE may just measure the last best TX beam using the last best RX beam or may measure all TX beams using the last best RX beam. In alternate embodiment, the UE start beam measurement 'T' duration 2650 before the start of 'On duration', by following the network's indication (i.e., one-bit to allow early wake-up in the DRX configuration RRC message, or fixed/maximum/minimum duration of 'T' in terms of time/number of sub-frames/number of slots/number of symbols/number of HARQ durations, or information to deduce 'T' 2650, such as the number of BS beams, the periodicity of RSs for such BS beams, the number of beams transmitted in a period, . . . ).

The UE determines if there is any TX beam whose RSRP/RSRQ/CQI/SINR/SNR is greater than a Threshold (or RSRP/RSRQ/CQI/SINR/SNR>=Threshold). If the UE find a TX beam, then the UE performs the following:

The UE sends beam feedback and downlink transmission request to the BS (at operation 2665). In one embodiment, the beam feedback can be sent using random access (dedicated or contention based) or using dedicated radio resources configured for beam feedback or using dedicated SR followed by beam feedback, or any subframe which the BS receives signals by sweeping BS's rx beams while the UE can transmit preamble without BS's scheduling, or any available subframe which is scheduled by the BS to transmit beam feedback. The beam feedback may include the information (e.g., beam id, RSRP/RSRQ/CQI/SINR/SNR, and the like) about best DL TX beam detected so far. Note that the UE can send beam feedback even before the start of 'On Duration' if the UE finds the best or suitable TX beam. In alternate embodiment, the UE sends beam feedback before the start of 'On duration' 2610, if the network is indication before (i.e., one-bit to allow such beam feedback in the DRX configuration RRC message, or fixed/maximum/minimum duration of 'T' 2650 for the UE to transmit early beam feedback in terms of time/number of sub-frames/number of slots/number of symbols/number of HARQ durations, or information to deduce the early beam feedback duration 'T' 2650, such as the number of BS beams, the periodicity of RSs for such BS beams, the number of beams transmitted in a period, . . . ).

After sending the beam feedback and downlink transmission request successfully (or after receiving the beam switching indication or N subframes after receiving the beam switching indication or from subframe indicated in beam switching indication or N subframes after sending beam feedback successfully, or after the UE changes beam), the UE starts monitoring the downlink and check for scheduling messages (at operation 2669). Note that the UE may send beam feedback and downlink transmission request before the start of 'On Duration' and will start monitoring the downlink and check for scheduling messages after sending the beam feedback successfully (or after receiving the beam switching indication or N subframes after receiving the beam switching indication or from subframe indicated in beam switching indication or N subframes after sending beam feedback successfully, or after the UE changes beam). Note that this may be even before the start of 'On Duration'. In alternate embodiment, the UE starts monitoring the downlink before the start of 'On duration' 2610, if the network is indication before (i.e., one-bit to allow such DL monitoring after UL beam feedback in the DRX configuration RRC message, or fixed/maximum/minimum duration of 'T' 2650 for the UE to monitor DL after UL beam feedback in terms of time/number of sub-frames/number of slots/number of symbols/number of HARQ durations, or information to deduce the DL monitoring duration after the UL beam feedback as 'T' 2650 in terms of the number of BS beams, the periodicity of RSs for such BS beams, the number of beams transmitted in a period, . . . ).

If the BS has data to transmit it will start transmitting data to the UE after receiving the downlink transmission request (at operation 2667). Note that this may be even before the 'On Duration'. Key point of this method is that the start of on duration can be preponed by UE's request. The BS of configured on duration need not be pre-poned. In alternate embodiment, the BS starts transmitting data to the UE if the previously signaled indication contains a permit to do so (i.e., indicator which mandates the UE to monitor DL information after a UL beam feedback (and/or after DL tx request reception from such the UE), one-bit to indicate such DL transmission will be happen after UL request in the DRX configuration RRC message, or fixed/maximum/minimum duration of 'T' 2650 for the UE to monitor DL after UL beam feedback in terms of time/number of sub-frames/number of slots/number of symbols/number of HARQ durations, or information to deduce the DL monitoring duration after UL beam feedback as 'T' 2650 in terms of the number of BS beams, the periodicity of RSs for such BS beams, the number of beams transmitted in a period, . . . ).

Note that this downlink transmission request may be a 'one-bit' indication field of physical layer control information which is multiplexed, or field of the mac message (or any other mac control element), or any other form of information multiplexed or embedded in the beam feedback.

Note that this network indication could be 'one-bit' or 'multi-bit' indication field of physical layer control information which is multiplexed, or field of the mac message (or any other mac control element), or field of the RRC message (RRCConnectionReconfiguration), or any other form of information multiplexed or embedded in any downlink signal.

Figure 27:
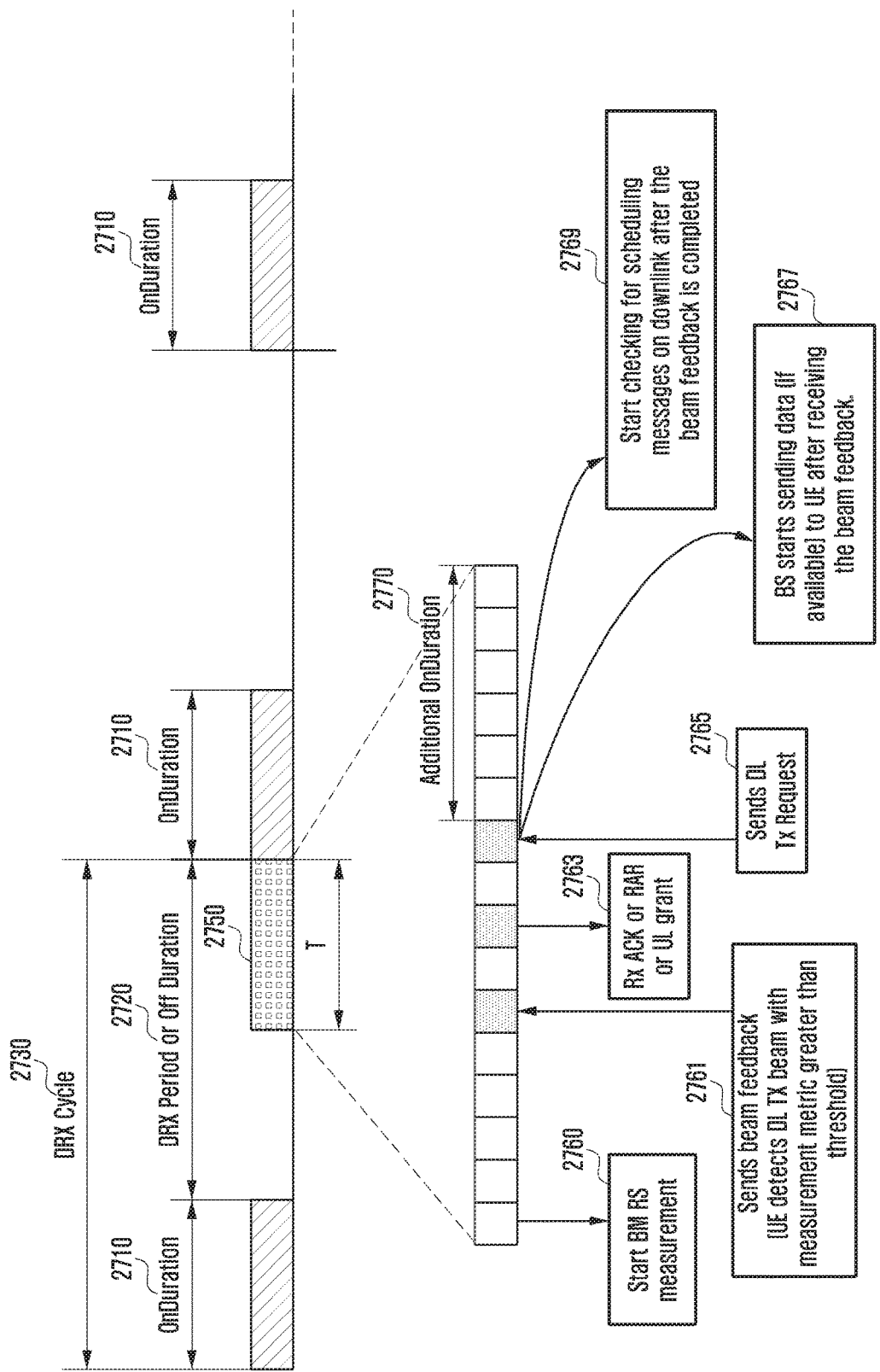
FIG. 27 illustrates a DRX cycle according to an embodiment of the present disclosure.
Figure 28:
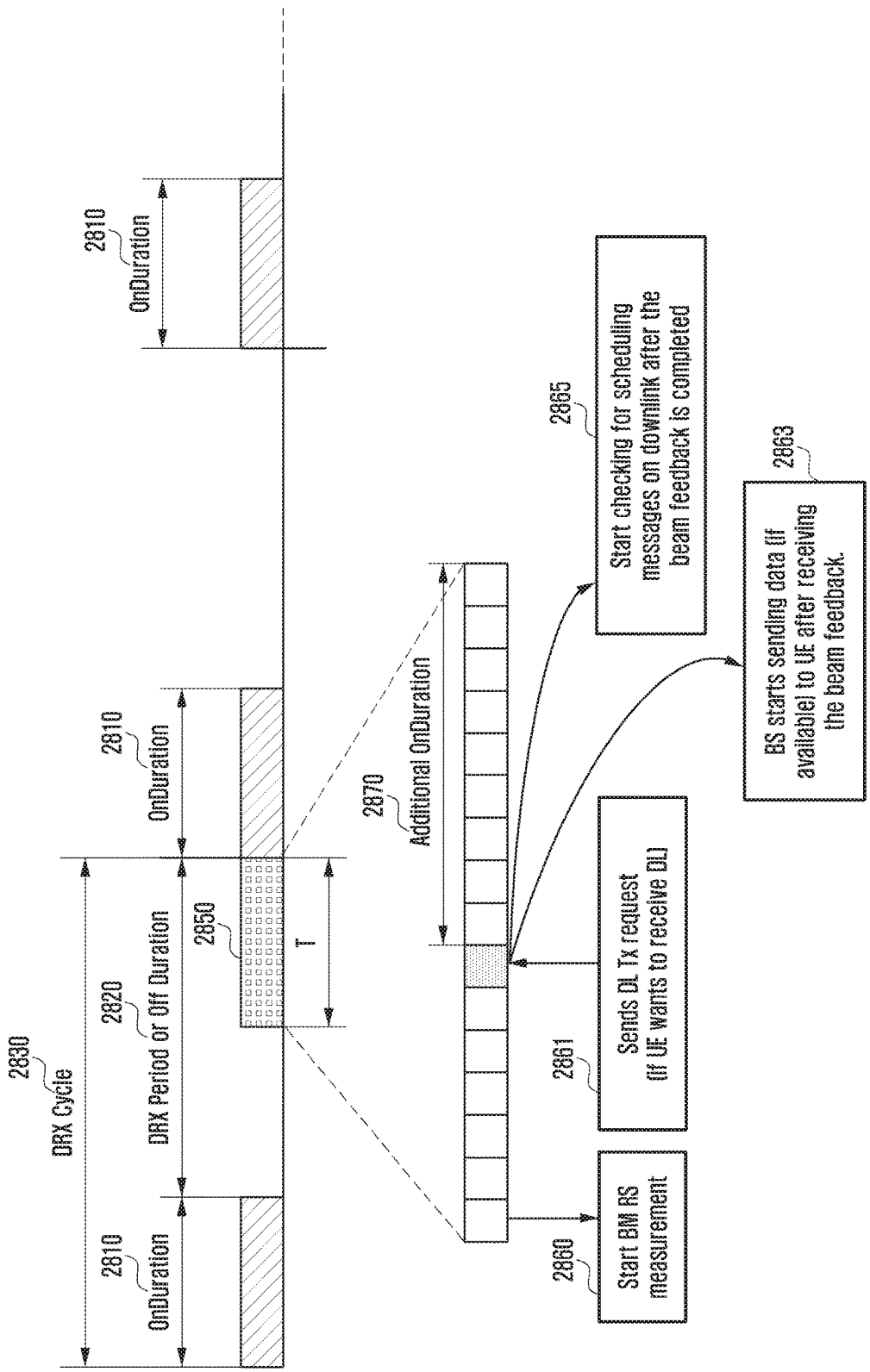
FIG. 28 illustrates a DRX cycle according to an embodiment of the present disclosure.

Method 9:

FIG. 27 illustrates a DRX cycle according to an embodiment of the present disclosure, and FIG. 28 illustrates a DRX cycle according to an embodiment of the present disclosure.

Referring to FIGS. 27 and 28, in a beam formed wireless communication system, a UE in RRC connected state may be configured with a DRX cycle 2730, 2830. A DRX cycle 2730, 2830 consists of an 'On Duration' 2710, 2810, and a 'DRX Period' 2720, 2820. The length of DRX cycle 2730, 2830, length of 'On Duration' 2710, 2810, and start of DRX Cycle 2730, 2830 is configured to the UE by the network (e.g., the BS) in signaling message. During the DRX period 2720, 2820, the UE can skip reception of downlink channels for battery saving purposes.

The UE starts beam measurement (i.e., measuring the beam formed RS, beam formed CSI-RS, or SS transmitted by the BS) 'T' duration 2750, 2850 before the start of 'On duration' 2710, 2810 (at operation 2760, at operation 2860). The duration 'T' 2750, 2850 may correspond to additional 'On Duration' 2770, 2870. The UE can determine the duration 'T' 2750, 2850 based on number of TX beams at the BS, number of RX beams at the UE, timer interval over which TX beams are transmitted by the BS. For example, if the BS has 28 TX beams and it transmits 7 TX beams every 5 ms and the UE has 4 RX beams, then the UE needs to wake up at least (28/7)*5*4=80 ms before the start of 'On Duration' 2710, 2810. In alternate embodiment, the UE may also use its velocity to determine number of RX beams and TX beams to use for beam measurement and accordingly determine value of 'T' 2750, 2850. For example if the UE is stationary, the UE may just measure the last best TX beam using the last best RX beam or may measure all TX beams using the last best RX beam. In alternate embodiment, the UE starts beam measurement 'T' duration 2750, 2850 before the start of 'On duration' 2710, 2810, by following the network's indication (i.e., one-bit to allow early wake-up in the DRX configuration RRC message, or fixed/maximum/minimum duration of 'T' 2750, 2850 in terms of time/number of sub-frames/number of slots/number of symbols/number of HARQ durations, or information to deduce 'T', such as the number of BS beams, the periodicity of RSs for such BS beams, the number of beams transmitted in a period, . . . ).

The UE determines if there is any TX beam whose RSRP/RSRQ/CQI/SINR/SNR is greater than a Threshold (or RSRP/RSRQ/CQI/SINR/SNR>=Threshold). If the UE find a TX beam, then the UE performs the following:

The UE sends beam feedback to the BS (at operation 2761), In one embodiment, the beam feedback can be sent using random access (dedicated or contention based) or using dedicated radio resources configured for beam feedback or using dedicated SR followed by the beam feedback, or any subframe which the BS receives signals by sweeping BS's rx beams while the UE can transmit preamble without BS's scheduling, or any available subframe which is scheduled by the BS to transmit beam feedback. The beam feedback may include the information (e.g., beam id, RSRP/RSRQ/CQI/SINR/SNR, and the like) about best DL TX beam detected so far. Note that the UE can send the beam feedback even before the start of 'On Duration' if the UE find the best or suitable TX beam. In alternate embodiment, the UE sends beam feedback before the start of 'On duration', if the network is indication before (i.e., one-bit to allow such beam feedback in the DRX configuration RRC message, or fixed/maximum/minimum duration of 'T' for the UE to transmit early beam feedback in terms of time/number of sub-frames/number of slots/number of symbols/number of HARQ durations, or information to deduce the early beam feedback duration 'T', such as the number of BS beams, the periodicity of RSs for such BS beams, the number of beams transmitted in a period, . . . ).

After sending the beam feedback successfully (or after receiving the beam switching indication or N subframes after receiving the beam switching indication or from subframe indicated in beam switching indication or N subframes after sending beam feedback successfully, or after the UE changes beam), the UE starts monitoring the downlink (at operation 2769, at operation 2865) and check for any ACK or RAR or UL grant messages (at operation 2763). Note that the UE may send the beam feedback before the start of 'On Duration' and will start monitoring the downlink and check for scheduling messages after sending the beam feedback successfully (or after receiving the beam switching indication or N subframes after receiving the beam switching indication or from subframe indicated in beam switching indication or N subframes after sending beam feedback successfully, or after the UE changes beam). Note that this may be even before the start of 'On Duration'. In alternate embodiment, the UE starts monitoring the downlink before the start of 'On duration', if the network is indication before (i.e., one-bit to allow such DL monitoring after UL beam feedback in the DRX configuration RRC message, or fixed/maximum/minimum duration of 'T' for the UE to monitor DL after UL beam feedback in terms of time/number of sub-frames/number of slots/number of symbols/number of HARQ durations, or information to deduce the DL monitoring duration after UL beam feedback as 'T' in terms of the number of BS beams, the periodicity of RSs for such BS beams, the number of beams transmitted in a period, . . . ).

After receiving such ACK or RAR or UL grant messages (at operation 2763), the UE sends downlink transmission request on the scheduled resources (scheduled by RAR or UL grant or ACK) to the BS (at operation 2765). Note that this may be even before the start of 'On Duration'.

If the BS has data to transmit, it will start transmitting data to the UE after receiving the downlink transmission request (at operation 2767, at operation 2863). Note that this may be even before the 'On Duration'. Key point of this method is that start of on duration can be preponed by UE's request. The BS of configured on duration need not be preponed.

Note that this downlink transmission request does not always have to be followed after beam feedback. This downlink transmission request could be transmitted over any other resources, outside of the on-duration, as shown in operation 2861 of FIG. 28.

Note that this downlink transmission request could be a 'one-bit' indication field of physical layer control information which is multiplexed, or field of the mac message (or any other mac control element), or any other form of information multiplexed or embedded in any message.

In an embodiment of the proposed disclosure CSI-RS configuration is valid even during the DRX period and the UE uses it for beam measurement. Alternately, the UE can be configured with CSI-RS configuration which is valid at pre-defined time occasions before ON-duration e.g., CSI-RS specific resources could be persistently/semi-persistently allocated using any network signaling (e.g., RRC, MAC).

In an embodiment of the proposed disclosure if the off duration (or DRX period) is less than a threshold (e.g., not long enough to perform full beam sweep or perform beam measurement) the UE does not sleep. The threshold can be predefined or signaled by the network.

In an embodiment of the proposed disclosure, the UE wakeup at start of the On-duration and monitors serving beam quality first and if it is not good, the UE does not decode PDCCH until beam reporting is completed. If serving beam quality is good, the UE monitors DL and decodes PDCCH.

In an embodiment of the proposed disclosure, the UE wakes up right before the ON duration ('X' time before ON duration, which is enough to measure just the previously used serving beam once or 'K' samples) and monitors the previously used (known) serving beam quality once, and if it is not good, the UE does not decode PDCCH until beam reporting is completed. If serving beam quality is good, the UE monitors DL and decodes PDCCH after the ON duration starts.

In an embodiment Network may signal the UE's wake-up time (before ON duration), such as:
  min/max requirement, such as the UE should wake up at least min. time before ON, and the UE can wake up upto max. time before ON.
  Min. requirement: consider eNB Tx beams and RS design (which eNB Knows), and min. UE Rx beams (which eNB considers)+beam recovery time (average/expected/max/min)
  Max. requirement: consider eNB Tx beams and RS design (which eNB Knows), and min. UE Rx beams (which eNB considers)+beam recovery time (average/expected/max/min)

Figure 29:
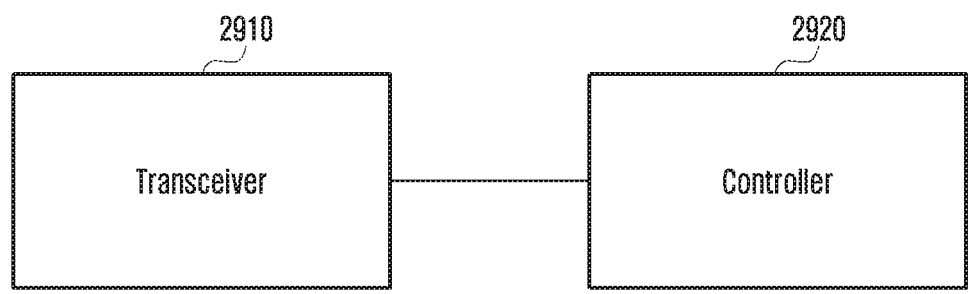
FIG. 29 is a block diagram of a UE according to an embodiment of the present disclosure.

FIG. 29 is a block diagram of a UE according to an embodiment of the present disclosure.

Referring to FIG. 29, the UE may include a transceiver 2810 and a controller 2820 to control the overall operation thereof.

A transceiver 2910 may transmit and receive signals to and from other network entities.

A controller 2920 may control the UE to perform a function according to one of the embodiments described before. For example, the controller 2920 may receive, from a BS, configuration information of DRX, perform beam measurement before a start of on duration of the DRX, transmit, to the BS, beam feedback information according to the beam measurement result, and perform a predetermined operation after transmitting the beam feedback information. And the controller 2920 may monitor downlink data before the start of the on duration of the DRX.

Although the controller 2920 and the transceiver 2910 are shown as separate entities, they may be realized as a single entity like a single chip. The controller 2920 and the transceiver 2910 may be electrically connected to each other.

The controller 2920 may be a circuit, an application-specific circuit, or at least one processor. UE operations may be implemented using a memory unit storing corresponding program codes. Specifically, the UE may be equipped with a memory unit to store program codes implementing desired operations, and the controller 2920 may read and execute the program codes stored in the memory unit.

Figure 30:
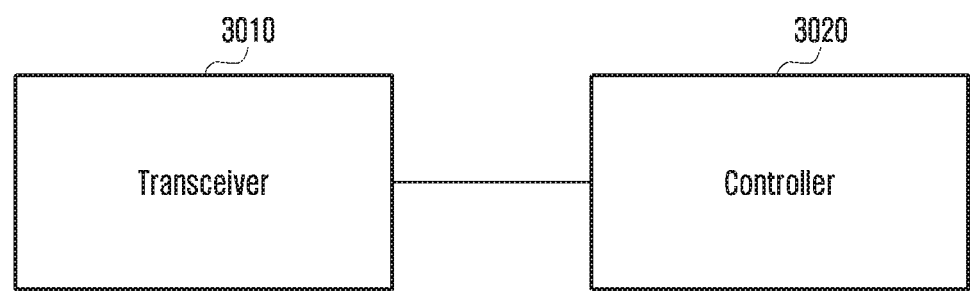
FIG. 30 is a block diagram of a BS according to an embodiment of the present disclosure.

FIG. 30 is a block diagram of a BS according to an embodiment of the present disclosure.

Referring to FIG. 30, the BS may include a transceiver 3010 and a controller 3020 to control the overall operation thereof.

The transceiver 3010 may transmit and receive signals to and from other network entities.

The controller 3020 may control the BS to perform a function according to one of the embodiments described before. For example, the controller 3020 may transmit, to a terminal, configuration information of DRX, receive, from the terminal, beam feedback information according to beam measurement before a start of on duration of the DRX, and if the BS has downlink data to transmit, transmit, to the terminal, indication indicating that the BS has downlink data to transmit. And the controller 3020 may transmit, to the terminal, the downlink data before the start of the on duration of the DRX and after receiving the beam feedback information.

Although the controller 3020 and the transceiver 3010 are shown as separate entities, they may be realized as a single entity like a single chip. The controller 3020 and the transceiver 3010 may be electrically connected to each other.

The controller 3020 may be a circuit, an application-specific circuit, or at least one processor. The BS operations may be implemented using a memory unit storing corresponding program codes. Specifically, the BS may be equipped with a memory unit to store program codes implementing desired operations, and the controller 3020 may read and execute the program codes stored in the memory unit.

It should be understood that schemes or methods and devices or components shown in FIGS. 1 to 30 are not intended to limit the scope of the present disclosure. It will also be apparent to those skilled in the art that the present disclosure may be practiced with only some of the aspects including components, entities, and operations described in FIGS. 1 to 30.

BS operations and UE operations described herein may be implemented using memory units storing corresponding program codes. Specifically, the BS or the UE may be equipped with a memory unit to store program codes implementing desired operations. To perform a desired operation, the controller of the BS or the UE may read and execute the program codes stored in the memory unit by using a processor or a central processing unit (CPU).

Various components and modules of the entity, BS or UE described in the specification may be implemented by use of hardware (such as complementary metal oxide semiconductor (CMOS) logic circuits), software, firmware (such as software stored in machine readable media), or a combination thereof. For example, various electrical structures and schemes may be realized by use of electric circuits, such as transistors, logic gates, and ASIC.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication method of a terminal, the communication method comprising:

receiving, from a base station, configuration information of discontinuous reception (DRX);

performing beam measurement before a start of an on duration of the DRX;

transmitting, to the base station, beam feedback information according to a result of the beam measurement; and performing a predetermined operation after transmitting the beam feedback information, wherein the performing of the predetermined operation comprises monitoring downlink data before the start of the on duration of the DRX and after the transmitting of the beam feedback information.

2. The method of claim 1, wherein the performing of the predetermined operation further comprises:

determining whether a message indicating the base station has the downlink data to transmit is received from the base station; and if the message is received from the base station, monitoring the downlink data before the start of the on duration of the DRX and after the transmitting of the beam feedback information.

3. The method of claim 2, wherein the performing of the predetermined operation further comprises:

if the message is not received from the base station, skipping the monitoring of the downlink data during the on duration of the DRX.

4. The method of claim 2, wherein the performing of the predetermined operation further comprises:

if the message is not received from the base station, monitoring the downlink data from the start of the on duration of the DRX.

5. The method of claim 1, wherein the performing of the predetermined operation further comprises:

if a message indicating the base station has the downlink data to transmit is received from the base station, monitoring the downlink data from the start of the on duration of the DRX; and if the message is not received from the base station, skipping the monitoring of the downlink data during the on duration of the DRX.

6. A communication method of a base station, the communication method comprising:

transmitting, to a terminal, configuration information of discontinuous reception (DRX);

receiving, from the terminal, beam feedback information according to beam measurement before a start of an on duration of the DRX; and if the base station has downlink data to transmit, transmitting, to the terminal, a message indicating that the base station has the downlink data to transmit before the start of the on duration of the DRX and after the receiving of the beam feedback information.

7. The method of claim 6, further comprising:

transmitting, to the terminal, the downlink data before the start of the on duration of the DRX and after receiving the beam feedback information.

8. A terminal comprising:

a transceiver configured to receive and transmit a signal; and a controller configured to:

receive, from a base station, configuration information of discontinuous reception (DRX), perform beam measurement before a start of an on duration of the DRX, transmit, to the base station, beam feedback information according to a result of the beam measurement, and perform a predetermined operation after transmitting the beam feedback information, wherein the transceiver is further configured to monitor downlink data before the start of the on duration of the DRX and after the transmitting of the beam feedback information.

9. The terminal of claim 8, wherein the controller is further configured to:

if a message indicating the base station has the downlink data to transmit is received from the base station, monitor the downlink data before the start of the on duration of the DRX and after the transmitting the beam feedback information, and if the message is not received from the base station, skip the monitoring of the downlink data during the on duration of the DRX.

10. The terminal of claim 8, wherein the controller is further configured to:

if a message indicating the base station has the downlink data to transmit is received from the base station, monitor the downlink data before the start of the on duration of the DRX and after the transmitting the beam feedback information, and if the message is not received from the base station, monitor the downlink data from the start of the on duration of the DRX.

11. The terminal of claim 8, wherein the controller is further configured to:

if a message indicating the base station has the downlink data to transmit is received from the base station, monitor the downlink data from the start of the on duration of the DRX; and if the message is not received from the base station, skip the monitoring of the downlink data during the on duration of the DRX.

12. A base station comprising:

a transceiver configured to receive and transmit a signal; and a controller configured to:

transmit, to a terminal, configuration information of discontinuous reception (DRX), receive, from the terminal, beam feedback information according to beam measurement before a start of an on duration of the DRX, and if the base station has downlink data to transmit, transmit, to the terminal, a message indicating that the base station has the downlink data to transmit before the start of the on duration of the DRX and after the receiving of the beam feedback information.

13. The base station of claim 12, wherein the controller is further configured to:

transmit, to the terminal, the downlink data before the start of the on duration of the DRX and after receiving the beam feedback information.

\* \* \* \* \*